United States Patent
Khanna et al.

(10) Patent No.: US 11,941,560 B2
(45) Date of Patent: Mar. 26, 2024

(54) SYSTEMS AND METHODS FOR GENERATING CONSTRUCTION MODELS FOR CONSTRUCTION PROJECTS

(71) Applicant: BFS Operations LLC, Dallas, TX (US)

(72) Inventors: Prakriti Khanna, Dallas, TX (US); Arumuganainar Ramaswamy, Bengaluru (IN); Kevin Prasanna Rajendran Racheal, Bengaluru (IN); Alfred Rhyne, San Francisco, CA (US); Andrew Garrett, Dallas, TX (US)

(73) Assignee: BFS Operations LLC, Dallas, TX (US)

( * ) Notice: Subject to any disclaimer, the term of this patent is extended or adjusted under 35 U.S.C. 154(b) by 0 days.

(21) Appl. No.: 17/465,643

(22) Filed: Sep. 2, 2021

(65) Prior Publication Data

US 2022/0083941 A1    Mar. 17, 2022

Related U.S. Application Data

(60) Provisional application No. 63/073,609, filed on Sep. 2, 2020.

(51) Int. Cl.
*G06Q 10/06* (2023.01)
*G06Q 10/0631* (2023.01)
(Continued)

(52) U.S. Cl.
CPC . *G06Q 10/06313* (2013.01); *G06Q 10/06311* (2013.01); *G06Q 10/06312* (2013.01); *G06Q 40/125* (2013.12); *G06Q 50/08* (2013.01)

(58) Field of Classification Search
None
See application file for complete search history.

(56) References Cited

U.S. PATENT DOCUMENTS

| | | | |
|---|---|---|---|
| 7,031,930 B2 * | 4/2006 | Freeman | G06Q 10/06 705/7.13 |
| 7,330,821 B2 | 2/2008 | Wares | |

(Continued)

OTHER PUBLICATIONS

Yang et al. (Rebecca Yang, Ron Wakefield, Sainan Lyu, Sajani Jayasuriya, Fengling Han, Xun Yi, Xuechao Yang, Gayashan Amarasinghe, Shiping Chen, Public and private blockchain in construction business process and information integration, Automation in Construction, vol. 118, 2020, 103276, ISSN 0926-5805, https://.*

*Primary Examiner* — Matthew D Henry
(74) *Attorney, Agent, or Firm* — Armstrong Teasdale LLP

(57) ABSTRACT

Provided herein is a construct computing system including a construct computing device including a processor in communication with at least one memory device. The processor is programmed to: (i) receive construction data associated with a construction project, wherein the construction data includes scheduling data, budgeting data, and drawing data, (ii) store, in the memory, the construction data, (iii) generate a schedule and a budget for the construction project based upon the construction data, (iv) receive, from a user computing device, input associated with the construction data, wherein the input includes a modification to at least one of the scheduling data, the budgeting data, and the drawings, and (v) modify at least one of the schedule, the budget, and the drawings based upon the input.

47 Claims, 33 Drawing Sheets

(51) Int. Cl.
  *G06Q 40/12*  (2023.01)
  *G06Q 50/08*  (2012.01)

(56) References Cited

U.S. PATENT DOCUMENTS

| | | | |
|---|---|---|---|
| 8,788,590 B2 | 7/2014 | Culver | |
| 9,679,038 B2 | 6/2017 | Omansky | |
| 2002/0087381 A1* | 7/2002 | Freeman | G06Q 10/06311 |
| | | | 705/7.13 |
| 2003/0018492 A1* | 1/2003 | Carlson | G06Q 10/06 |
| | | | 703/1 |
| 2003/0052877 A1* | 3/2003 | Schwegler, Jr. | G06T 19/00 |
| | | | 345/420 |
| 2004/0205206 A1 | 10/2004 | Naik et al. | |
| 2006/0010005 A1 | 1/2006 | Rowland | |
| 2007/0061774 A1 | 3/2007 | Chan et al. | |
| 2008/0015823 A1 | 1/2008 | Arnold et al. | |
| 2008/0288539 A1 | 11/2008 | Jacobs | |
| 2009/0124394 A1 | 5/2009 | Swarna | |
| 2010/0185547 A1 | 7/2010 | Scholar | |
| 2010/0257015 A1 | 10/2010 | Molander | |
| 2012/0078924 A1 | 3/2012 | Woodings et al. | |
| 2013/0338970 A1 | 12/2013 | Reghetti | |
| 2014/0236656 A1 | 8/2014 | Nielsen et al. | |
| 2014/0365533 A1 | 12/2014 | Debray et al. | |
| 2015/0081363 A1 | 3/2015 | Taylor et al. | |
| 2015/0234377 A1 | 8/2015 | Mizikovsky | |
| 2015/0242979 A1 | 8/2015 | Abts | |
| 2016/0048785 A1 | 2/2016 | Dommarajukrishnamaraju | |
| 2016/0140504 A1 | 5/2016 | Obeid | |
| 2016/0188369 A1 | 6/2016 | Moloian et al. | |
| 2016/0253640 A1 | 9/2016 | Allin et al. | |
| 2016/0294621 A1 | 10/2016 | Werth et al. | |
| 2017/0243144 A1 | 8/2017 | Nielsen et al. | |
| 2017/0278026 A1 | 9/2017 | Nielsen et al. | |
| 2018/0096274 A1 | 4/2018 | DeZeeuw | |
| 2019/0057354 A1 | 2/2019 | McKenzie | |
| 2020/0019907 A1 | 1/2020 | Notani et al. | |
| 2020/0134745 A1 | 4/2020 | McLinden et al. | |
| 2021/0035383 A1* | 2/2021 | Blackburn | G06Q 10/0875 |

* cited by examiner

SYSTEMS AND METHODS FOR GENERATING CONSTRUCTION MODELS FOR CONSTRUCTION PROJECTS

CROSS-REFERENCE TO RELATED APPLICATIONS

This application claims priority to U.S. Provisional Application No. 63/073,609, filed Sep. 2, 2021, the entire contents and disclosures of which are hereby incorporated herein by reference in its entirety.

BACKGROUND

The disclosure relates generally to multi-task construction projects, and more specifically to network-based systems and methods for generating, storing, and modifying a schedule, a budget, and drawings associated with a construction project.

In the construction industry, construction projects include numerous tasks that must be completed in a timely manner. The budgets and schedules of the projects are usually set before the projects are started and can be difficult to modify once the project has been started. In addition, the project schedules and budgets may be difficult to update because any information and relationships between the budgets and schedules must be manually changed any time a variable for the project changes. Typical project schedules and budgets are updated on a periodical basis such as weekly, monthly, or yearly based on information that is received during the period since the last update. Accordingly, the project schedules and budgets may not truly be complete, updated, or accurate at any given time during the project.

Further, drawings are an integral part of projects, especially in displaying the specifications and details and parts of the project. Drawings are usually the first place modifications to projects are made. However, modifications made to the drawings may not be carried out to the other integral parts of the project (e.g., the budgets and schedules) due to the modifications having to be manually changed any time the drawings are changed. In addition, modifications made to the drawings of a user may not be shown to other users viewing the drawings (e.g., on other user devices).

Accordingly, there is a need for systems and methods that are configured to generate a schedule and a budget for a construction project, and update the schedule and budget as modifications to the project are made. Further, there is a need for systems and methods that are configured to modify each of the schedule, budget, and drawings each time a modification is made to any of the schedule, budget, and drawings.

BRIEF DESCRIPTION

In one aspect, a construct computing system including a construct computing device including at least one processor in communication with at least one memory device is provided. The at least one processor is programmed to: (i) receive construction data associated with a construction project, wherein the construction data includes scheduling data, budgeting data, and drawing data, (ii) store, in the memory, the construction data, (iii) generate a schedule and a budget for the construction project based upon the construction data, (iv) receive, from a user computing device, input associated with the construction data, wherein the input includes a modification to at least one of the scheduling data, the budgeting data, and the drawings, and/or (v) modify at least one of the schedule, the budget, and the drawings based upon the input.

In another aspect, a computer-implemented method implemented by a construct computing system including a construct computing device including at least one processor in communication with at least one memory device is provided. The computer-implemented method comprises: (i) receiving construction data associated with a construction project, wherein the construction data includes scheduling data, budgeting data, and drawing data, (ii) storing, in the memory, the construction data, (iii) generating a schedule and a budget for the construction project based upon the construction data, (iv) receiving, from a user computing device, input associated with the construction data, wherein the input includes a modification to at least one of the scheduling data, the budgeting data, and the drawings, and/or (v) modifying at least one of the schedule, the budget, and the drawings based upon the input.

In another aspect, at least one non-transitory computer-readable media having computer-executable instructions embodied thereon is provided. When executed by a construct computing system including a construct computing device including at least one processor in communication with at least one memory device, the computer-executable instructions cause the at least one processor to: (i) receive construction data associated with a construction project, wherein the construction data includes scheduling data, budgeting data, and drawing data, (ii) store, in the memory, the construction data, (iii) generate a schedule and a budget for the construction project based upon the construction data, (iv) receive, from a user computing device, input associated with the construction data, wherein the input includes a modification to at least one of the scheduling data, the budgeting data, and the drawings, and/or (v) modify at least one of the schedule, the budget, and the drawings based upon the input.

In another aspect, a construction computing system including a drawings computing device including at least one processor in communication with at least one memory device is provided. The at least one processor is programmed to: (i) store, in the memory, a plurality of construction drawings associated with a construction project, (ii) display, through a drawings application in communication with the drawings computing device, the plurality of construction drawings on a user computing device, (iii) receive, from the user computing device, modifications to at least one construction drawing of the plurality of construction drawings, wherein the modifications are input directly into the drawings application, (iv) store, in the at least one memory, the modifications to the at least one construction drawing, (v) update the relevant construction drawings based upon the modifications, and/or (vi) display the modified construction drawings on the user computing device.

In another aspect, a computer-implemented method implemented by a construct computing system including a construct computing device including at least one processor in communication with at least one memory device is provided. The computer-implemented method comprises: (i) storing, in the memory, a plurality of construction drawings associated with a construction project, (ii) displaying, through a drawings application in communication with the drawings computing device, the plurality of construction drawings on a user computing device, (iii) receiving, from the user computing device, modifications to at least one construction drawing of the plurality of construction drawings, wherein the modifications are input directly into the drawings application, (iv) storing, in the at least one memory, the modifications to the at least one construction drawing, (v) updating the relevant construction drawings based upon the modifications, and/or (vi) displaying the modified construction drawings on the user computing device.

In another aspect, at least one non-transitory computer-readable media having computer-executable instructions embodied thereon is provided. When executed by a construct computing system including a drawings computing device including at least one processor in communication with at least one memory device, the computer-executable instructions cause the at least one processor to: (i) store, in the memory, a plurality of construction drawings associated with a construction project, (ii) display, through a drawings application in communication with the drawings computing device, the plurality of construction drawings on a user computing device, (iii) receive, from the user computing device, modifications to at least one construction drawing of the plurality of construction drawings, wherein the modifications are input directly into the drawings application, (iv) store, in the at least one memory, the modifications to the at least one construction drawing, (v) update the relevant construction drawings based upon the modifications, and/or (vi) display the modified construction drawings on the user computing device.

BRIEF DESCRIPTION OF THE DRAWINGS

FIG. 11 is an illustration of an "Add Budget" window of the budgeter application shown in FIG. 2.

FIG. 13 is an illustration of a "Margin Analysis" window of the budgeter application shown in FIG. 2.

Figure 1:
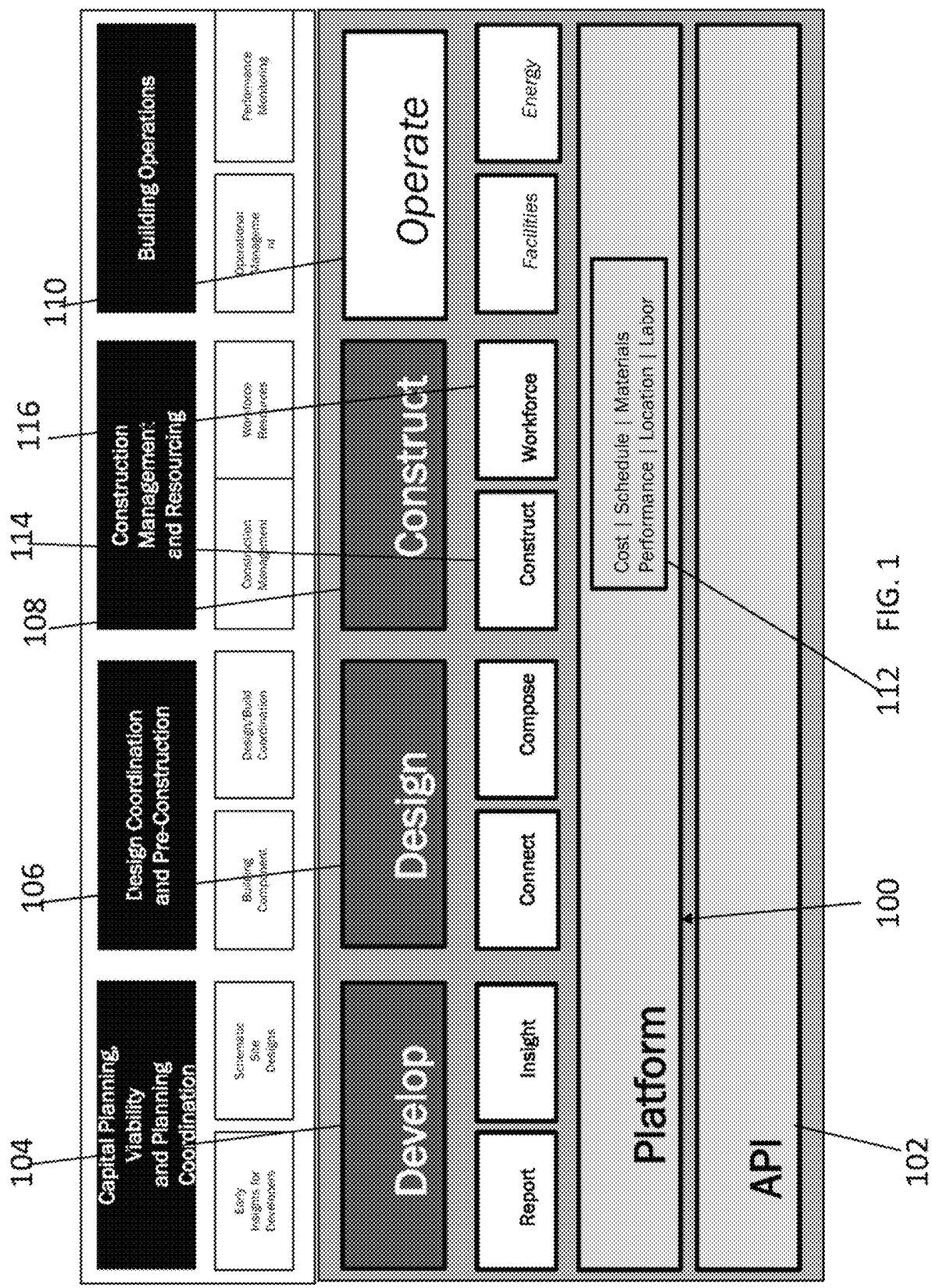
FIG. 1 is a schematic block diagram of a platform for use with multi-task projects.

The Figures depict embodiments for purposes of illustration only. One skilled in the art will readily recognize from the following discussion that other embodiments of the systems and methods illustrated herein may be employed without departing from the scope of the disclosure.

DETAILED DESCRIPTION

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods described in this present disclosure include a multi-task project ("MTP") platform including a construct system configured to generate and/or store a schedule, a budget, and drawings for a construction project. The MTP platform may further include a design system, a develop system, a workforce system (e.g., that may be part of the construct system), and an operate system. For the construct system, when modifications are made (e.g., by a user) to any of the schedule, budget, and drawings, a construct computing system is configured to modify each of the schedule, budget, and drawings based upon the modifications made. The construct computing system includes multiple computing devices in network communication with one another. Specifically, the construct computing system includes a construct computing device (also referred to herein as a construct server) that includes at least one processor and a memory in communication with a database. Further, the construct computing device includes and/or is in communication with a scheduler application, a budgeter application, and a drawings application. Each of the scheduler application, the budgeter application, and the drawings application may have a separate processor and memory such that the scheduler, budgeter, and drawings applications are able to process corresponding data (e.g., scheduling, budget, and drawing data) from the construct computing device and transmit the processed data to the construct computing device. Accordingly, the construct computing device may maintain the memory (e.g., a database) including storing and updating the schedule, the budget, and the drawings. The construct computing system also includes one or more third party computing devices and one or more user computing devices that are in communication with the construct computing device. Embodiments of an MTP platform, a construct system, a construct computing system, and a construct computing device are shown, for example, in FIGS. 1-3C and 27-31.

The construct computing system generates a budget and a schedule from construction data (e.g., scheduling data, budgeting data, and drawing data, as described further herein) and stores drawings associated with a construction project (e.g., the construction and/or building of a residential or commercial building, structure, fixture, or any other project that requires construction). The construct computing system includes a scheduler application, a budgeter application, and a drawings application that are configured to process the scheduling, budgeting, and drawings data, respectively. The scheduler, budgeter, and drawings applications also enable users to input respective data into and receive respective data from the construct computing device. That is, the scheduler, budgeter, and drawings applications allow users to view respective data and input modifications to any of the budget, schedule, and drawings. In response to receiving the modifications to the budget, schedule, or drawings from the applications, the construct computing system is configured to modify each of the schedule, budget, and drawings based upon the modifications from the user. That is, a modification made to the drawings would not only modify the drawings, but the construct computing system would also modify the schedule and budget based upon the drawing modifications. Accordingly, the construct computing system integrates multiple aspects (e.g., budgets, schedules, and drawings) of a construction project together such that each aspect can be seamlessly modified and updated throughout the lifespan of the construction project. Further, due to the construct computing system centrally storing the schedule, the budget, and the drawings such that the schedule, budget, and drawings can be updated in real-time or near-real-time, the construct computing system ensures that each user associated with the user computing devices of the construct computing system is able to view the updated schedule, budget, and/or drawings and that each user is able to view the same schedule, budget, and/or drawings that each other user is viewing.

Further, the construct computing system, through the drawings application, displays the drawings for the construction project such that users can easily interact with and modify the construction drawings directly through a user interface of a user computing device of the user. In the exemplary embodiment, users can link multiple drawings together, link a request for information (e.g., requesting information from a supervising user or any other user capable of replying to the request to resolve questions or gaps in the information included in the drawing data) directly to the drawing, annotate directly on the drawing so that the user and any other users viewing the drawing are able to view the annotation when viewing the drawing, tag the drawings with one or more keywords associated with the drawings, classify and sort the drawings, replace the drawings with newer versions of the drawings, overlay different versions of the drawings such that users can see differences between different versions of the drawings, link photos or files (e.g., stored locally on a user computing device) directly to the drawings, and carry out further actions and/or modifications to the drawings, as described herein. Accordingly, the construct computing system, through the drawings application, provides a user interface that allows users to seamlessly interact with the drawings of a construction project.

The systems and methods described herein enable the construct computing device, a workforce system, and/or third party computing devices to access and/or store data in a database. For example, the database may include construction data including (i) scheduling data including a project specification, a construction activity schedule, a workforce schedule, and a plurality of tasks required to complete the construction project, (ii) budgeting data including a parts list, construction site conditions, a budget for the construction project, an allocation list indicating a percentage of the budget allocated for each aspect of the construction project, and costs associated with each aspect of the construction project, and (iii) drawings data including construction drawings associated with the construction project and data associated with the construction drawings. The construct computing device, itself or through the scheduler, budgeter, and/or drawings applications, utilizes the construction data to generate and modify a schedule, a budget, and drawings associated with the construction project. Accordingly, since the construct computing device is at least in communication with the scheduler application, the budget application, the drawings application, the database, and the user computing devices the construct computing device is uniquely situated to update, store, and maintain the schedule, budget, and drawings.

At least one of the technical problems addressed by this system may include: (i) improving the sharing of data across multiple applications associated with a construction project where the data might not otherwise be shared due to each application having a different purpose; (ii) modifying all data associated with the construction project when any of the data is modified such that users do not have to manually input all modifications; (iii) enabling accurate management and forecasting for multi-task projects which may not share data on budgets, schedules, and drawings in an easily accessible manner; (iv) linking data between different applications such that modifications made at one application will cause modifications to be sent to other applications for further processing such that multiple data outputs are generated and a central database may be updated, and/or (v) improving bandwidth of multi-task construction platforms by enabling the platforms to rely on construction data that is stored in a single file or in a single database.

Exemplary technical effects of the systems and methods described herein may include, for example: (i) sharing of data in a standardized format across multiple applications associated with a construction project; (ii) automatically modifying all data associated with the construction project when one or more sets of data are modified; (iii) providing a platform for viewing and modifying drawings that tracks modifications to the drawings and allows users to directly link data to the drawings; (iv) providing an accurate schedule and budget for the construction project based upon scheduling, budget, and drawing data; (v) increasing the accuracy and reliability of project (e.g., schedule and budget) forecasting and estimating by utilizing a common stream of data for multiple applications and systems; (vi) modifying and updating the schedule and budget in real-time based upon modifications made to any of the schedule, budget, and drawings input by users; (vii) improving data utilization and storage for construction projects; (viii) improving the speed and efficiency of approving change orders and therefore the completion of construction projects by automatically determining a supervising user that needs to approve the change order and sending the change order directly to the supervising user; (ix) centrally storing data for maintaining an updated schedule, budget, and/or drawings and distributing the processing of schedule, budget, and drawings modifications; (x) using machine learning and/or artificial intelligence techniques to improve budget predictions, schedule predictions, and modifications to the budget, schedule, and/or drawings when one of the budget, schedule, and drawings is modified; and/or (xi) utilizing a blockchain to maintain and securely store modifications to the schedule, budget, and/or drawings.

The methods and systems described herein may be implemented using computer programming or engineering techniques including computer software, firmware, hardware, or any combination or subset thereof, wherein the technical effects may be achieved by performing at least one of the following steps: (i) receiving construction data associated with a construction project, wherein the construction data includes scheduling data, budgeting data, and drawing data, (ii) storing, in the memory, the construction data, (iii) generating a schedule and a budget for the construction project based upon the construction data, (iv) receiving, from a user computing device, user input associated with the construction data, wherein the user input includes a modification to at least one of the scheduling data, the budgeting data, and the drawings, and/or (v) modifying at least one of the schedule, the budget, and the drawings based upon the user input.

Further, the methods and systems described herein may be implemented using computer programming or engineering techniques including computer software, firmware, hardware, or any combination or subset thereof, wherein the technical effects may be achieved by performing at least one of the following steps: (i) storing, in the memory, a plurality of construction drawings associated with a construction project, (ii) displaying, through the drawing application, the plurality of construction drawings on a user computing device, (iii) receiving, from the user computing device, modifications to at least one construction drawing of the plurality of construction drawings, wherein the modifications are input directly into the drawing application by the user, (iv) storing, in the at least one memory, the modifications to the at least one construction drawing, (v) updating the relevant construction drawings based upon the modifications, and/or (vi) displaying the modified construction drawings on the user computing device.

Multi-Task Project Platform

FIG. 1 is a schematic block diagram of a multi-task construction project platform, generally indicated at 100, for use with multi-task projects. The platform 100 includes systems and modules for use during various stages of construction projects. In addition, the platform 100 has a user interface for users to collaborate with each other, view project data, manage construction activities, and design and create documents for the multi-task project. The platform 100 utilizes application programming interfaces (API) 102 to interact with applications and operating systems. Preferably, the APIs 102 utilize a common structure that is compatible with a broad range of applications and operating systems to provide increased adaptability and utilization. For example, the API 102 may enable the platform 100 to interact with systems for building information modeling (BIM), computer aided drafting (CAD), enterprise resource planning (ERP), accounting, design functions, human resource management, and the internet of things (JOT). Further, the API 102 (e.g., through specifications of the API) allows the data transmitted and received by each of the broad range of applications to be used by each of the other range of applications. For example, the API 102 may ensure that the data transmitted and received by each application is formatted in a specific way such that data that is not typically related (e.g., scheduling data, budgeting data, and drawing data) can be used by each application (e.g., a scheduler application, a budgeter application, and a drawings application).

The platform 100 includes one or more modules. For example, the platform 100 includes a develop module 104, a design module 106, a construct module 108, and an operate module 110. Each module 104, 106, 108, 110 provides tools, options, and reports that are tailored to phases of the multi-task project. However, the modules 104, 106, 108, 110 may be used during any phase of the multi-task project and are not used exclusively in chronological order. For example, a user may utilize the operate module 110 during a preconstruction or design phase of a multi-task project to assess expected performance of a proposed design based on a model of the completed project or historical data from a similar project. Moreover, the modules 104, 106, 108, 110 may utilize and share a common stream of data which increases the accuracy, reliability, and consistency of the reports and data generated by the platform 100. For example, the platform 100 may include one or more databases 112 including data relating to costs, schedules, materials, performance, location, labor, etc. Accordingly, the platform 100 may enable the use of real-time data and simplify the updates for the modules 104, 106, 108, 110 because the data is provided in a single location.

The develop module 104 is configured for use during initial stages of a multi-task project, for example, to generate or gather financial data, site data, feasibility studies, etc. In addition, the develop module 104 may be used for capital planning, viability assessment, and planning coordination. For example, a user may select a specific site or a list of site requirements using the develop module 104 and receive data regarding the site. In addition, the develop module 104 may generate a site assessment or other development report based on the user requirements and selections using the real-time data provided by the platform 100. In contrast, conventional development reports require data to be gathered from numerous sources. In contrast, the develop module 104 decreases the cost, labor, and time required to generate development reports in comparison to conventional systems. As a result, the develop module 104 may allow the user to evaluate a greater number of potential sites and select the site that best matches the requirements for the multi-task project.

The design module 106 is configured for use during the design phase of the multi-task project, for example, to generate project specifications, models, and drawings. In addition, the design module 106 may be used to provide design coordination and preconstruction planning. The design module 106 may interact with CAD software to allow uploading and/or editing of at least partially completed plans. In addition, the design module 106 may allow the user to prepare or compose new drawings. In addition, the design module 106 may enable two or more users to communicate and interact with each other to coordinate the multi-task project. In some embodiments, the design module 106 is used throughout the different phases of the multi-task project. For example, in a design-build construction process, the design module 106 may be used in conjunction with the construct module 108 to perform design functions while the construct module 108 is used to perform project management tasks during the multi-task project.

The construct module 108 is configured for use during a construction phase of the multi-task project to manage, for example, the project schedule, workforce, costs, materials, drawings, etc. The construct module 108 may include a construct system 114 which facilitates management of the project schedule, materials, costs, and drawings, as described further with respect to FIGS. 2, 3A, and 3B. In addition, the construct module 108 may include a workforce system 116 which facilitates management of the workforce for the multi-task project. For example, the workforce system 116 may be used to generate a worker assignment schedule for the multi-task project. The workforce system 116 may build the worker assignment schedule from work schedule data that includes labor hours, a projected time frame, and worker roles for each task of the multi-task project. In the worker assignment schedule, the workforce system 116 assigns workers to roles for each task of the multi-task project based on the worker availability and the worker location. The workforce system 116 assigns qualified workers to the worker roles and verifies that the workers are available for the time frame of the task. In addition, the workforce system 116 may track performance data for the workers on the respective project and provide real-time updates regarding the project workforce. Moreover, the workforce system 116 may provide automated alerts when there are worker shortages, missed assignments, or other workforce issues.

The operate module 110 is configured for use during an operation phase of the multi-task project after construction is at least substantially completed. The operate module 110 provides operation data such as as-built information, settings for heating ventilation and air conditioning equipment, electrical controls, care and service information, warranty information, replacement information, and utility information. The operate module 110 may provide more accurate data for the user than conventional systems because the operate module 110 is able to access data that is used during the construction phases and receives data directly from the develop module 104, the design module 106, and the construct module 108. Moreover, the operate module 110 may allow the user to better control aspects of the operation to obtain increased efficiency in comparison to prior systems. For example, the operate module 110 may determine recommended settings for the HVAC in real-time based on current environmental conditions and the data from the construction, design, and develop phases such as building materials used for the building envelope, as-built drawings, conditions of the HVAC system, and desired performance criteria used during the develop phase. Moreover, the operate module may enable tracking of the performance data of the completed multi-task project for use in other multi-task projects. As a result, the operate module may provide increased operating efficiency such as by decreasing energy usage during the life of the structure.

The platform 100 may be accessible by users throughout the multi-task project for varying purposes using one or more user interfaces. The platform 100 may selectively allow authorized users to view, edit, manage, upload, and/or download data in the platform. For example, the platform may have a user interface for designers to add and edit drawings and a contractor interface that allows contractors to view drawings and submit questions regarding the drawings. In addition, the platform 100 may allow users to communicate with each other and the platform 100 may correlate the communication to specific documents or data stored or generated by the platform 100. Accordingly, the platform 100 provides a single platform for use through all phases of a multi-task project through conception, execution, and after construction is completed. As a result, the multi-task project is able to be completed in a shorter time frame and provide a higher quality product than multi-task projects that do not utilize the platform.

In addition, the platform 100 facilitates the management of two or more multi-task projects because the platform provides data that can be shared across the projects, such as scheduling data, budgeting data, and drawing data. In addition, the platform 100 provides real-time updates on data that can affect the multi-task projects such as delays in the schedule or large budgeting changes. In addition, the user may use the platform 100 to manage multi-task projects from any location using a computing device.

Construct System

Figure 2:
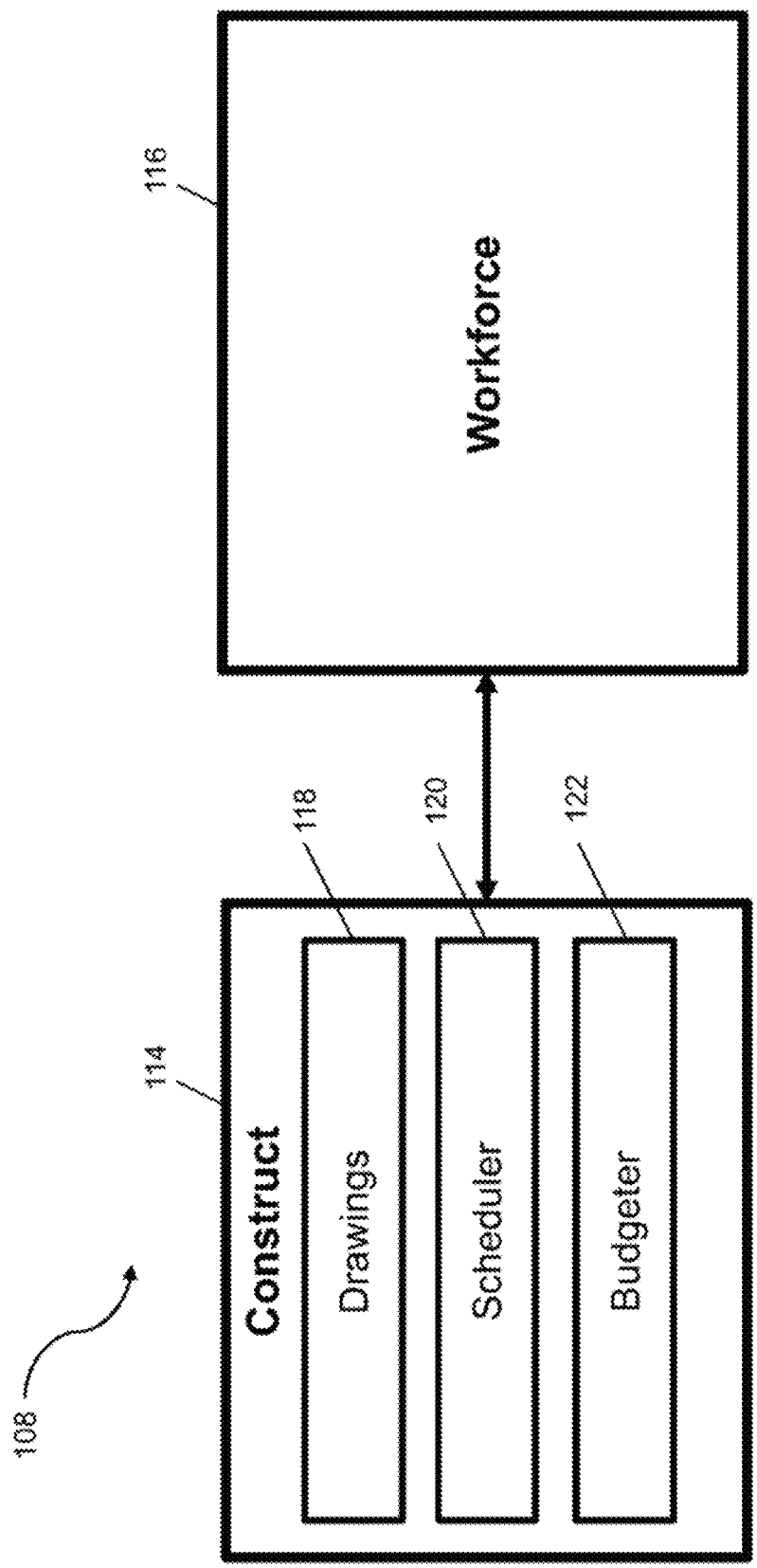
FIG. 2 is a schematic diagram of a construct system and a workforce system of the platform of FIG. 1, the construct system including a scheduler application, a budgeter application, and a drawings application.

FIG. 2 is a schematic block diagram showing the construction module 108 in greater detail. The construct system 114 and the workforce system 116 of the construction module 108 are communicatively coupled to one another such that the construct system 114 and the workforce system 116 can share data (e.g., scheduling data) between the systems 114 and 116. The construct system 114 includes three applications: a drawings application 118, a scheduler application 120, and a budgeting application 122. Each of the applications 118, 120, 122 of the construct system 114 is in communication with each other application 118, 120, 122 of the construct system 114. Further, the applications 118, 120, 122 may also be in communication with, either directly or indirectly through the construct system 114, the workforce system 116.

Figure 3A:
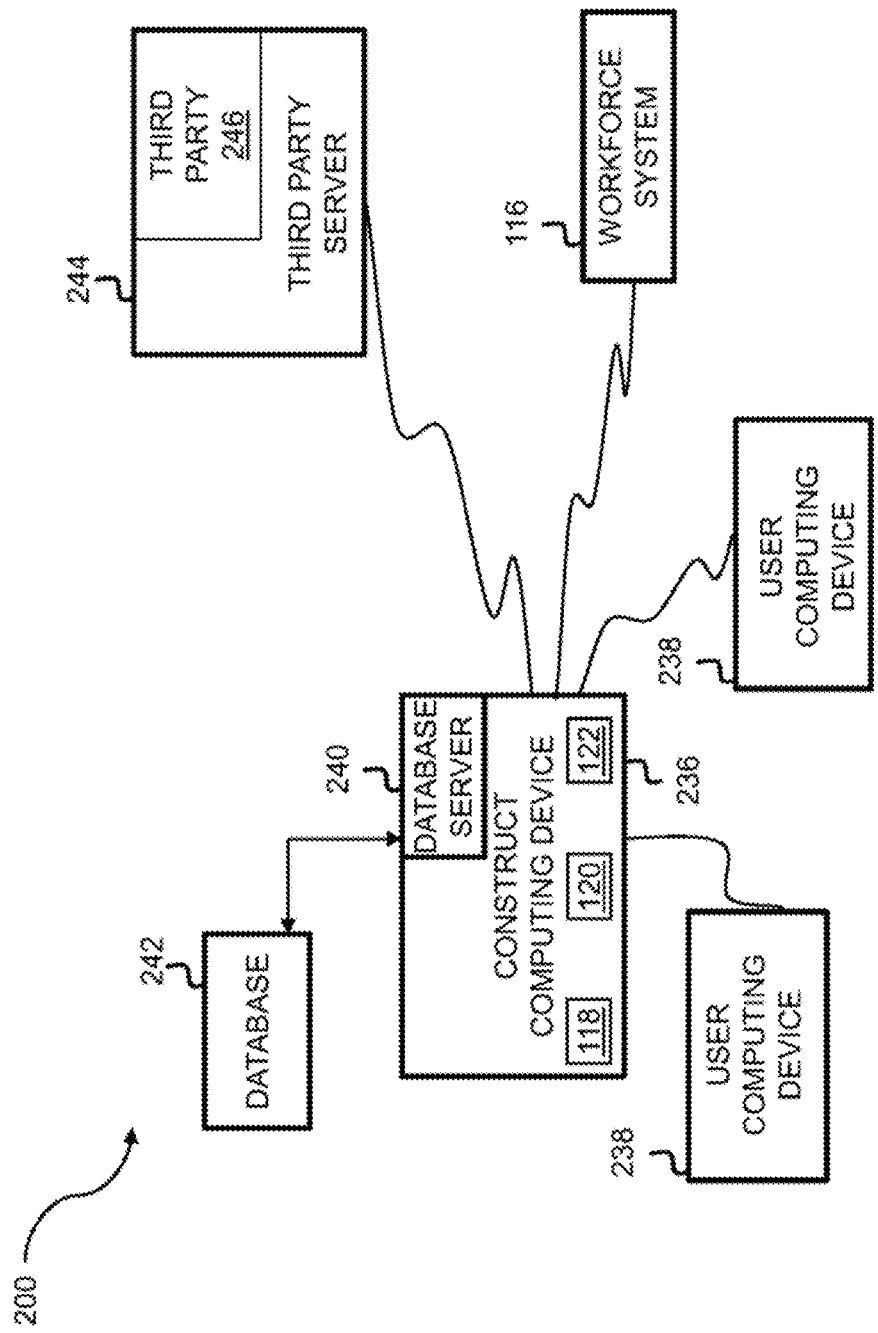
FIG. 3A is a simplified block diagram of a construct computing system of the system shown in FIG. 2.

FIG. 3A depicts a simplified block diagram of a construct computing system 200 of the construction module 108 shown in FIG. 2. The construct computing system 200 includes a construct computing device 236. The construct computing device 236 may include and/or be in communication with the drawings application 118, the scheduler application 120, and the budgeter application 122. In one embodiment, the applications 118, 120, 122 are each processors included in the construct computing device 236, and the applications 118, 120, 122 may each be configured to process data from the construct computing device 236 that corresponds to each application 118, 120, 122. For example, the construct computing device 236 may send drawing data to the drawing application 118, scheduling data to the scheduler application 120, and budgeting data to the budgeter application 122 such that the applications 118, 120, 122 may more efficiently process the data. In another embodiment, the applications 118, 120, 122 are processors, servers, and/or computing devices that are separate from the construct computing device 236 and are in communication with the construct computing device 236.

In the exemplary embodiment, the construct computing device 236 is in communication with user computing devices 238. In the exemplary embodiment, the user computing devices 238 are computers that include a web browser or a software application, which enables the user computing devices 238 to access the construct computing device 236 using the Internet. More specifically, the user computing devices 238 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The user computing devices 238 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 240 may be communicatively coupled to a database 242 that stores data. In one embodiment, the database 242 may include scheduling data (e.g., a project specification, a construction activity schedule, a workforce schedule, and a plurality of tasks required to complete the construction project), budgeting data (e.g., a parts list, construction site conditions, a budget for the construction project, an allocation list indicating a percentage of the budget allocated for each aspect of the construction project, and costs associated with each aspect of the construction project), drawings data (e.g., construction drawings associated with the construction project and data associated with the construction drawings), workforce data (e.g., workforce assignment schedules, tasks, and performance data), and any other data associated with the construction project. In the exemplary embodiment, the database 242 may be stored remotely from the construct computing device 236. In some embodiments, the database 242 may be decentralized. In the exemplary embodiment, a user may access the database 242 via the user computer devices 238 by logging onto the construct computing device 236.

The construct computing device 236 may be communicatively coupled with the workforce system 116 such that the construct computing device 236 and the workforce system 116 may transmit and receive data relating to the construction project to each other. The construct computing device 236 and the workforce system 116 may be communicatively coupled through the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

The construct computing device 236 may be communicatively coupled with the user computer devices 238. In some embodiments, the construct computing device 236 may be associated with, or is part of a computer network associated with a company that generates construction budgets, schedules, and drawings, or in communication with the company's computer network (not shown). In other embodiments, the construct computing device 114 may be associated with a third party and is merely in communication with the company's computer network.

One or more third party servers 244 may be communicatively coupled with the construct computing device 114. The one or more servers 244 each may be associated with a third party 246 (e.g., a vendor or supplier). The third party 246 may sell products and/or services required for the construction project. For example, the third party 246 may provide labor for performing tasks of the multi-task project and/or supply products or materials for use for the multi-task project.

Figure 3B:
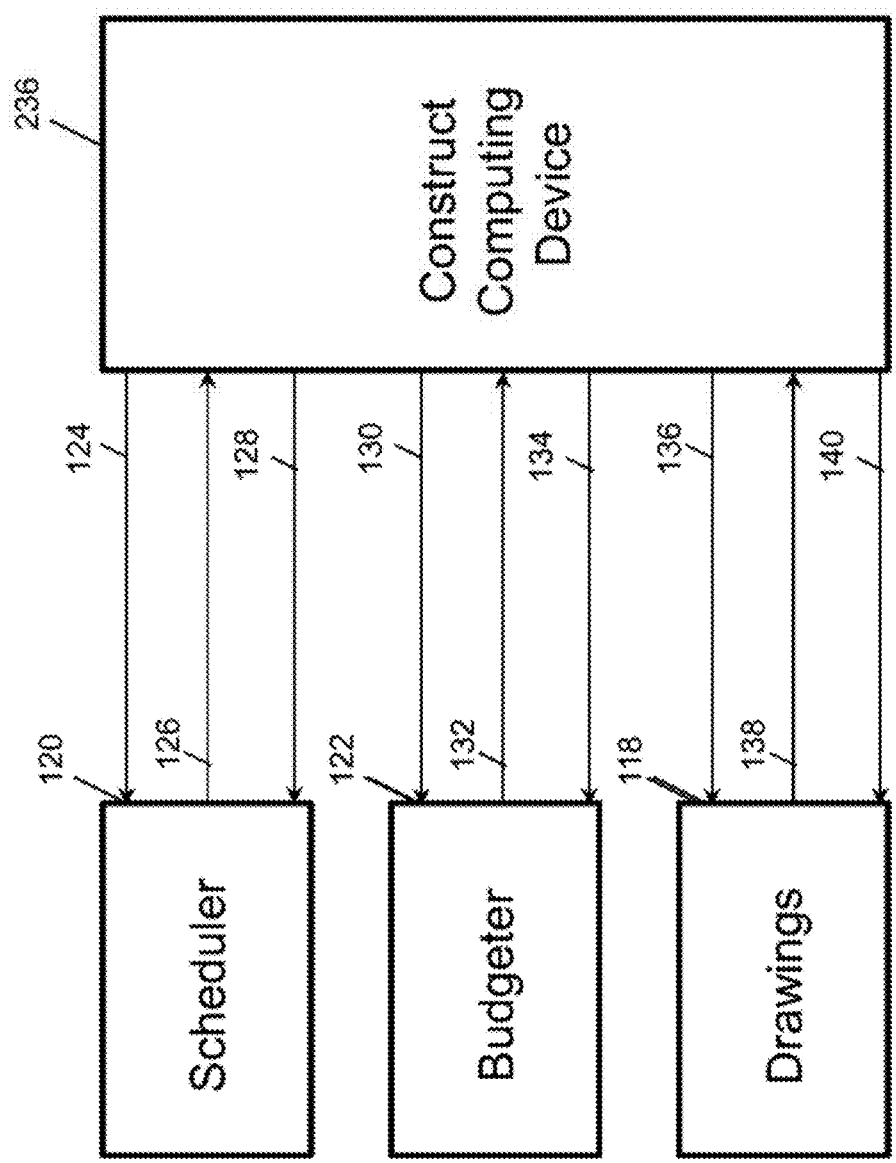
FIG. 3B is a flowchart of data flow through the construct computing system shown in FIG. 3A.
Figure 3C:
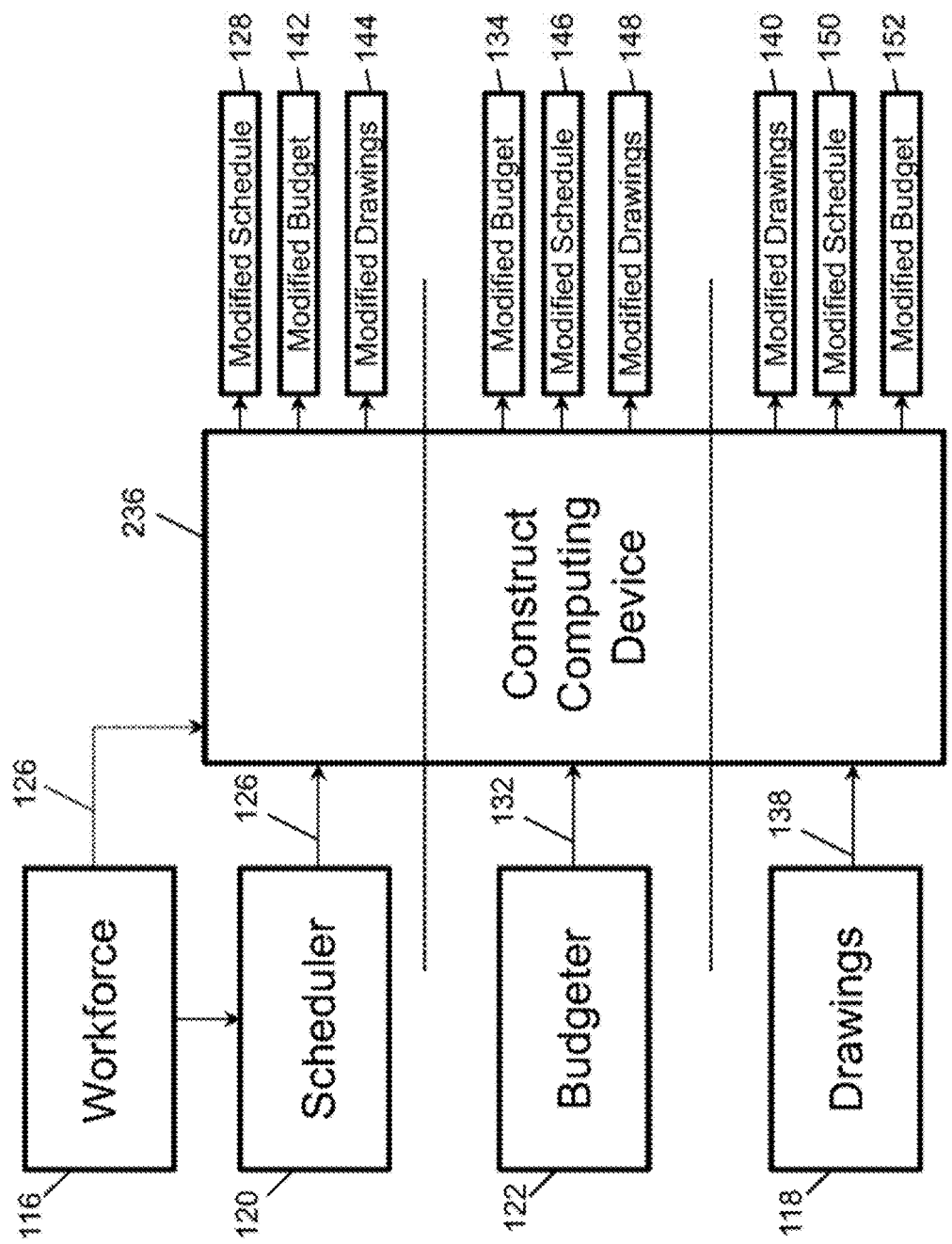
FIG. 3C is a detailed flowchart of the data flow through the construct computing system shown in FIG. 3B.

FIGS. 3B and 3C are schematic diagrams of an exemplary embodiment of data flows of the construct computing system 200. FIG. 3B shows an overall data flow between the construct computing system 200 and the applications 118, 120, 122, and FIG. 3C shows a detailed data flow between the construct computing system 200 and the applications 118, 120, 122 when modifications are input into the applications 118, 120, 122. The construct computing system 200 is configured to generate and/or store a schedule 124, a budget 130, and drawings 136 for a construction project. When modifications are made (e.g., by a user) to any of the schedule 124, budget 130, and drawings 136, the construct computing system 200 is configured to modify each of the schedule 124, budget 130, and drawings 136 based upon the modifications made. The construct computing system 200 includes one or more applications 118, 120, 122 that are used to process and display data related to the schedule 124, budget 130, and drawings 136. In the exemplary embodiment, the construct computing system 200 includes the drawings application 118, the scheduler application 120, and the budgeter application 122. In other embodiments, more applications may be added.

In the exemplary embodiment, the construct computing system 200 generates the schedule 124 and the budget 130 and stores and displays the drawings 136. The schedule 124 may include a list of tasks that need to be completed during the construction of the construction project and a timeframe associated with completing each of the tasks, a target start time and a target end time for each task, a Gantt chart showing the target start and end times for each task along with the progress of each task, a workforce schedule including assignments of workers to the tasks, and any other information related to the scheduling of the construction project. The construct computing system 200 may generate the schedule 124 using scheduling data (e.g., inputting the scheduling data into a model of the construct computing system 200 to generate and display the schedule 124). Scheduling data may include, for example, a project specification including details required to complete the construction project, a construction activity schedule, a workforce schedule, and a plurality of tasks required to complete the construction project.

The scheduling data may be input to the construct computing system 200 by one or more users, the construct computing system 200 may generate the scheduling data based upon minimal user input (e.g., the construct computing system 200 may generate all of the scheduling data based upon a project specification and/or drawings 136), or the construct computing system 200 may use a combination of both. For example, one or more users may input drawings of the construction project and a project specification including a target completion date for the construction project, the type of work that needs to be done throughout the construction project, and tasks that need to be completed throughout the construction project. Further, a workforce system (e.g., workforce system 116 shown in FIG. 3A) may input a workforce schedule including workers assigned to the tasks and a workforce schedule associated with the tasks to the construct computing system 200 as scheduling data. The construct computing system 200 may compile all of the scheduling data and generate the schedule 124 based upon the scheduling data. For example, the construct computing device 236 may compile the scheduling data (e.g., from the database 242 shown in FIG. 3A) and transmit the scheduling data to the scheduler application 120 to process the scheduling data and generate the schedule 124. Once the scheduler application 120 generates the schedule 124, the scheduler application 120 may transmit the schedule 124 to the construct computing device 236 for maintenance and storing of the schedule 124. Further, the construct computing system 200 may display the schedule 124 to users associated with the construction project through the scheduler application 120. The schedule 124 may be displayed, for example, as a list of tasks that need to be completed, a Gantt chart showing the proposed schedule and progress of each task, a chart showing where the project stands versus the proposed schedule, etc.

In some embodiments, the scheduling data also includes billing data including rules indicating when contractors and workers need to get paid. The rules may vary between the contractors and workers. For example, some contracting companies may require payment for the workers of the contracting companies on the $1^{st}$ and $15^{th}$ of every month. Other contracting companies may require payment for the workers of the contracting companies every two weeks. Accordingly, the construct computing system 200 may generate a billing schedule based upon the billing data and add the billing schedule to the schedule 124. The billing schedule may ensure that contractors and workers are paid timely and may eliminate any unforeseen bills or conflicts to ensure that the construct project is completed timely and efficiently.

The budget 130 may include an overall budget for the construction project, a budget allocation for each of a category of the budget 130 (e.g., materials, workforce, construction site costs, transportation costs, etc.), an actual cost analysis of the budget 130 including all changes made to the budget 130 throughout the course of the construction project, a cost of the changes made to the budget 130, and margin analysis. The construct computing system 200 may generate the budget 130 using budgeting data (e.g., inputting the budgeting data into a model of the construct computing system 200 to generate and display the budget 130). Budgeting data may include, for example, a parts list, construction site conditions, a budget for the construction project, an allocation list indicating a percentage of the budget allocated for each aspect of the construction project, and costs associated with each aspect of the construction project.

The budgeting data may be input to the construct computing system 200 by one or more users, the budgeting data may come from a third party (e.g., a parts company, a materials company, a contracting company, etc.), and/or the construct computing system 200 may look up a portion of the budgeting data (e.g., using an Internet search engine). The construct computing system 200 may compile all of the budgeting data and generate the budget 130 based upon the budgeting data. For example, the construct computing device 236 may compile the budgeting data (e.g., from the database 242) and send the budgeting data to the budgeter application 122 to process the budgeting data and generate the budget 130. Once the budgeter application 122 generates the budget 130, the budgeter application 122 may transmit the budget 130 to the construct computing device 236 for maintenance and storing of the budget 130. Further, the construct computing system 200 may display the budget 130 to users associated with the construction project through the budgeter application 122. The budget 130 may be displayed, for example, as a list of tasks and the cost associated with each task, a total budget and an allocation of the budget to each category of items, an overall cost analysis, a change cost analysis, etc.

The drawings 138 may include drawings and associated drawing data of the construction project. The drawing data may include, for example, modification data, time data, user modification data, drawing type data, drawings tags, etc. The drawings 138 may be uploaded by one or more users of the construct computing system 200 and/or a third party (e.g., the third party 246 shown in FIG. 3A including a drafting service, a contracting service, etc.). In some embodiments, the construct computing system 200 may review the drawings 138 to note any inconsistencies between the drawings 138 and check for any problems or errors in the drawings 138. For example, the construct computing device 236 may compile the drawings 136 and drawing data (e.g., from the database 242) and send the drawings 136 and drawing data to the drawings application 118 for processing (e.g., to check for errors in the drawings 136). Once the drawings application 118 has processed the drawings 136, the drawings application 118 may send the drawings 136 to the construct computing device 236 for storage and maintenance. Further, the construct computing system 200 may display the drawings 138 through the drawings application 118.

Each application 118, 120, 122 includes an interface that enables a respective user to input and/or receive data (e.g., through displaying the data) from the construct computing device 236. Specifically, each application 118, 120, 122 allows the users to view a respective schedule 124, budget 130, and/or drawings 136 and input modifications 126, 132, 138 to the schedule 124, budget 130, and/or drawings 136, respectively. In response to modifications 126, 132, 138 being input to the scheduler application 120, the budgeter application 122, and/or the drawings application 118, the construct computing system 200 modifies each of the schedule 124, budget 130, and drawings 136. In some embodiments, when a user inputs modifications 126, 132, 138 to the schedule 124, budget 130, and/or drawings 136, the modifications 126, 132, 138 may need to be approved by a supervising user (e.g., a project manager) before the modifications 126, 132, 138 are implemented. Users, supervising users associated with the users, and rules associated with approving modifications may be stored by the construct computing system 200 (e.g., in database 242). Due to at least some of the modifications 126, 132, 138 needing to be approved before being implemented, the construct computing system 200 may generate a change order for the modifications 126, 132, 138. The change order may include the details of the modification 126, 132, 138 and the effects of the modification 126, 132, 138 on any of the schedule 124, budget 130, and/or drawings 136. The change order may be transmitted to the computing device of the supervising user such that the supervising user can make an informed approval of the modification 126, 132, 138. Once the change order is approved, the construct computing system 200 may implement the modifications 126, 132, 138 to the schedule 124, budget 130, and/or drawings 136.

In the exemplary embodiment, when, for example, a modification 126 is made to the schedule 124 by a user (e.g., through the scheduler application 120), the scheduler application 120 may process the modification 126 and transmit the modification 124 to the construct computing device 236. The construct computing device 236, either itself or through the scheduler application 120, implements the modification 126 to the schedule 124 and transmits a modified schedule 128 to the scheduler application 120. Further, the construct computing device 236 stores (e.g., in the database 242) the modified schedule 128 such that when another modification 124 is made to the schedule 124, the modified schedule 128 is modified, not the original schedule 124.

When a modification 132 is made to the budget 130 by a user (e.g., through the budgeter application 122), the budgeter application 122 may process the modification 132 and transmit the modification 132 to the construct computing device 236. The construct computing device 236, either itself or through the budgeter application 122, implements the modification 132 to the budget 130 and transmits a modified budget 134 to the budgeter application 122. Further, the construct computing device 236 stores (e.g., in the database 242) the modified budget 134 such that when another modification 132 is made to the budget 130, the modified budget 134 is modified, not the original budget 130.

When a modification 138 is made to the drawings 126 by a user (e.g., through the drawings application 118), the drawings application 118 may process the modification 138 and transmit the modification 138 to the construct computing device 236. The construct computing device 236, either itself or through the drawings application 118, implements the modification 138 to the drawings 138 and transmits modified drawings 140 to the drawings application 118. Further, the construct computing device 236 stores (e.g., in the database 242) the modified drawings 140 such that when another modification 138 is made to the drawings 136, the modified drawings 140 are modified, not the original drawings 136.

Modifications 126 to the schedule 124 include, for example, delays in the schedule 124 due to human error, weather, or other unforeseen issues, adding tasks to the schedule 124 as the construction project is started and additional tasks are realized, workforce schedule changes, and any other types of modifications 126 that affect the schedule 124. Modifications 132 to the budget 130 include, for example, changing allocations of the different categories of the budget 130, adding or removing different materials, adding or removing people of the workforce depending on how the construction project progresses, changing costs associated with the different categories if the costs increase or decrease, etc. Modifications 138 to the drawings 134 include, for example, adding or removing parts of the drawings 134, annotating the drawings 134, linking a request for information (RFI), a link to a local file or image, an inspection request, and/or a safety observation to the drawings 134, linking a change order request to the drawings 134, linking one or more drawings 134 together, requesting to overlay one or more drawings 134 on top of one another, etc.

Additionally, in response to the modifications 126, 132, 138, the construct computing system 200 not only modifies the schedule 124, the budget 130, and the drawings 136 associated with the modifications 126, 132, 138, the construct computing system 200 also modifies the other of the schedule 124, the budget 130, and the drawings 138 based upon the modifications 126, 132, 138, as shown in FIG. 3C. That is, a schedule modification 126 that is input to the construct computing system 200 (e.g., through the scheduler application 120 and/or the workforce system 116) not only results in a modified schedule 128, the schedule modification 124 also causes the construct computing system 200 to output a modified budget 142 and/or modified drawings 144 based upon the schedule modification 124. A budget modification 132 that is input to the construct computing system 200 (e.g., through the budgeter application 122) not only results in a modified budget 134, the budget modification 132 also causes the construct computing system 200 to output a modified schedule 146 and/or modified drawings 148 based upon the budget modification 132. Additionally, a drawings modification 138 that is input to the construct computing system 200 (e.g., through the drawings application 118) not only results in modified drawings 140, the drawings modification 138 also causes the construct computing system 200 to output a modified schedule 150 and a modified budget 152 based upon the drawings modification 138. In the exemplary embodiment, the construct computing system 200 determines the other modifications needed for the schedule 124, budget 130, and/or drawings 136 based upon the modification 126, 132, 138 input by the user. In other embodiments, the modification 126, 132, 138 input by the user may include the modifications that need to be made to each of the schedule 124, budget 130, and drawings 136. That is, the user, when making the modification 126, 132, 138 may also input the modifications for each of the schedule 124, budget 130, and drawings 136. The construct computing system 200 is able to determine whether the additional modifications need to be made due to the single data stream of scheduling data, budgeting data, and drawings data that the construct computing system 200 has access to and can analyze.

For example, the user may input a schedule modification 126 (e.g., a schedule update request), through the scheduler application 120, that modifies the schedule 124 of a task due to the task taking longer than scheduled. In some embodiments, the construct computing system 200 may perform a look-up in a database (e.g., the database 242) to determine a supervising user of the user that input the schedule modification 126 and prompt the supervising user to accept the schedule modification 126, if necessary (e.g., if the user holds a position that requires approval of modifications). The construct computing system 200 may modify the schedule 124 based upon the schedule modification 126 (e.g., by adding the additional time for the task to the schedule as requested in the schedule update request and/or by determining how much additional time is needed for the task) and transmit the modified schedule 128 to the scheduler application 120. The scheduler application 120 may display the modified schedule 128 to the user, and in some embodiments, prompt the user and/or the supervising user of the user to verify the modified schedule 128 is correct. Additionally, the construct computing system 200 may determine whether modifications need to be made to the budget 130 and/or the drawings 136 based upon the schedule modification 126. Since the schedule modification 124 is related to a task requiring more time, the construct computing system 200 may determine that the budget 130 needs to be modified to include the extra time required for the task. Accordingly, the construct computing system 200 may generate a modified budget 142 (e.g., through the budgeter application 122) that includes the cost of having the workforce complete the task in the additional time. Further, the construct computing system 200 may determine that no modified drawings 144 are necessary due to the schedule modification 124 only requesting more time to complete a task, not any tasks or drawings being modified.

For further example, the user may input a budget modification 132, through the budgeter application 122, that modifies the budget 130 of the construction project to allocate a lesser percentage of funds to a category (e.g., materials) of the budget 130 due to another category being over budget. In some embodiments, the construct computing system 200 may perform a look-up in a database (e.g., database 242) to determine a supervising user of the user that input the budget modification 132 and prompt the supervising user to accept the budget modification 132, if necessary (e.g., if the user holds a position that requires approval of modifications). In other embodiments, the construct computing system 200 may only allow supervising users or other users (e.g., users associated with the financing of the construction project) to input the budget modification 132. The construct computing system 200 may modify the budget 130 based upon the budget modification 132 (e.g., by allocating the smaller percentage of the budget 130 to the materials) and transmit the modified budget 134 to the budgeter application 120 and/or the construct computing device 236. The budgeter application 122 may display the modified budget 134 to the user, and in some embodiments, prompt the user and/or the supervising user of the user to verify the modified budget 134 is correct. Additionally, the construct computing device 114 may determine whether modifications need to be made to the schedule 124 and/or the drawings 136 based upon the budget modification 132. For example, the construct computing system 200 may generate (e.g., using machine learning and/or artificial intelligence, as described below) a modified schedule 146 and modified drawings 148 that include recommendations that could be made to the schedule 124 and the drawings 136 based upon the lower modified budget 134. For example, the recommendations included in the modified schedule 146 may include using a smaller workforce for certain tasks and/or completing certain tasks faster to save money, and the recommendations included in the modified drawings 148 may include cutting down on design elements that are only decorative in nature to save money.

Additionally, for example, the user may input a drawing modification 138 (e.g., adding an additional support beam to a drawing 136), through the drawings application 118, that modifies the drawing 136. In some embodiments, the construct computing system 200 may perform a look-up in a database (e.g., database 242) to determine a supervising user of the user that input the drawing modification 138 and prompt the supervising user to accept the drawing modification 138, if necessary (e.g., if the user holds a position that requires approval of modifications). The construct computing system 200 may modify the drawing 136 based upon the drawing modification 138 (e.g., by adding the additional support beam to the drawing 136) and transmit the modified drawing 140 to the drawings application 118. The drawings application 118 may display the modified drawing 140 to the user, and in some embodiments, prompt the user and/or the supervising user of the user to verify the modified drawing 140 is correct. Additionally, the construct computing system 200 may determine whether modifications need to be made to the schedule 124 and/or the budget 130 based upon the drawing modification 138. The construct computing system 200 may determine that the schedule 124 needs to be modified to include the extra time associated with adding the additional beam. Accordingly, the modified schedule 150 may be transmitted to the scheduler application 120 (e.g., through the construct computing device 236), the modified schedule 150 including the extra time associated with the drawing 136. Further, the construct computing system 200 may determine that the budget 130 needs to be modified to include the cost of the additional support beam and the cost of the workforce associated with constructing and/or placing the additional support beam. Accordingly, the modified budget 152 may be transmitted to the budgeter application 122 (e.g., through the construct computing device 236).

In some embodiments, the construct computing system 200 may utilize machine learning and/or artificial intelligence techniques to determine additional modifications that need to be made to any of the schedule 124, the budget 130, and the drawings 136 in response to receiving the schedule modifications 126, the budget modifications 132, and the drawing modifications 138. Specifically, the construct computing system 200 may generate a model based upon prior modifications made to the schedule 124, budget 130, and/or drawings 136 that predicts the additional modifications that need to be made to any of the schedule 124, budget 130, and drawings 136 based upon an input of the schedule modification 126, the budget modification 132, and/or the drawings modification 138 that are received by the construct computing system 200 (e.g., from a user of the user computing device).

Further, the construct computing system 200 may use a blockchain to store all of the modifications made to the schedule 124, the budget 130, and the drawings 136. Specifically, the construct computing system 200 may use the blockchain as a distributed database or journal that uses cryptography to maintain a continuously-growing list of ordered records, known as blocks. Each block may contain at least a timestamp and a link to the previous block in the chain, as well as one or more transactions (e.g., journal entries). The link to the previous block may be a hash of the previous block. For a schedule, for example, one block may contain, for example, the initial schedule generated by the construct computing system 200 based upon the scheduling data. A next block may contain a modification to the schedule that was input by the user (e.g., through a schedule modification 126) and/or generated by the construct computing system 200 based upon other modifications (e.g., to the budget and/or the drawings), and may also contain a hashed copy of the previous block as well. Another block may contain one or more additional modifications to the schedule 124 and a hashed copy of the previous block. This continues on with each block adding on to the next while containing a hash of the previous blocks in the blockchain. The budget and drawings blockchains are created in substantially the same way as the schedule blockchain. Accordingly, the use of the blockchain allows the construct computing system 200 to manage and organize all modifications to the schedule 124, budget 130, and drawings 136 and ensures that all of the modifications are saved such that users are able to go back and look at the different modifications.

In some embodiments, the applications 118, 120, 122 are encrypted and only specified users may be authorized to use each application. However, users may have authorization to access more than one application. In some embodiments, the data may be exchanged directly between two or more of the applications 118, 120, 122 and may not necessarily pass through the construct computing device 236. For example, the workforce system 116 may communicate directly with the scheduler application 120 without communicating with the construct computing device 236.

Scheduler Application

FIGS. 4-9 are illustrations of an exemplary embodiment of the scheduler application 120 displayed on a user interface. The user interface allows a user to operate the construct computing system 200, access data, and make modifications to the schedule 124, as shown in the illustrations of the scheduler application 120. The user interface may be accessed on a computing device including a processor in communication with a memory. A user may input data and/or interact with the user interface using any suitable input device. For example, the computing device may include a computer mouse, a keyboard, and/or a touch screen which allows the user to select the icons and buttons.

Figure 4:
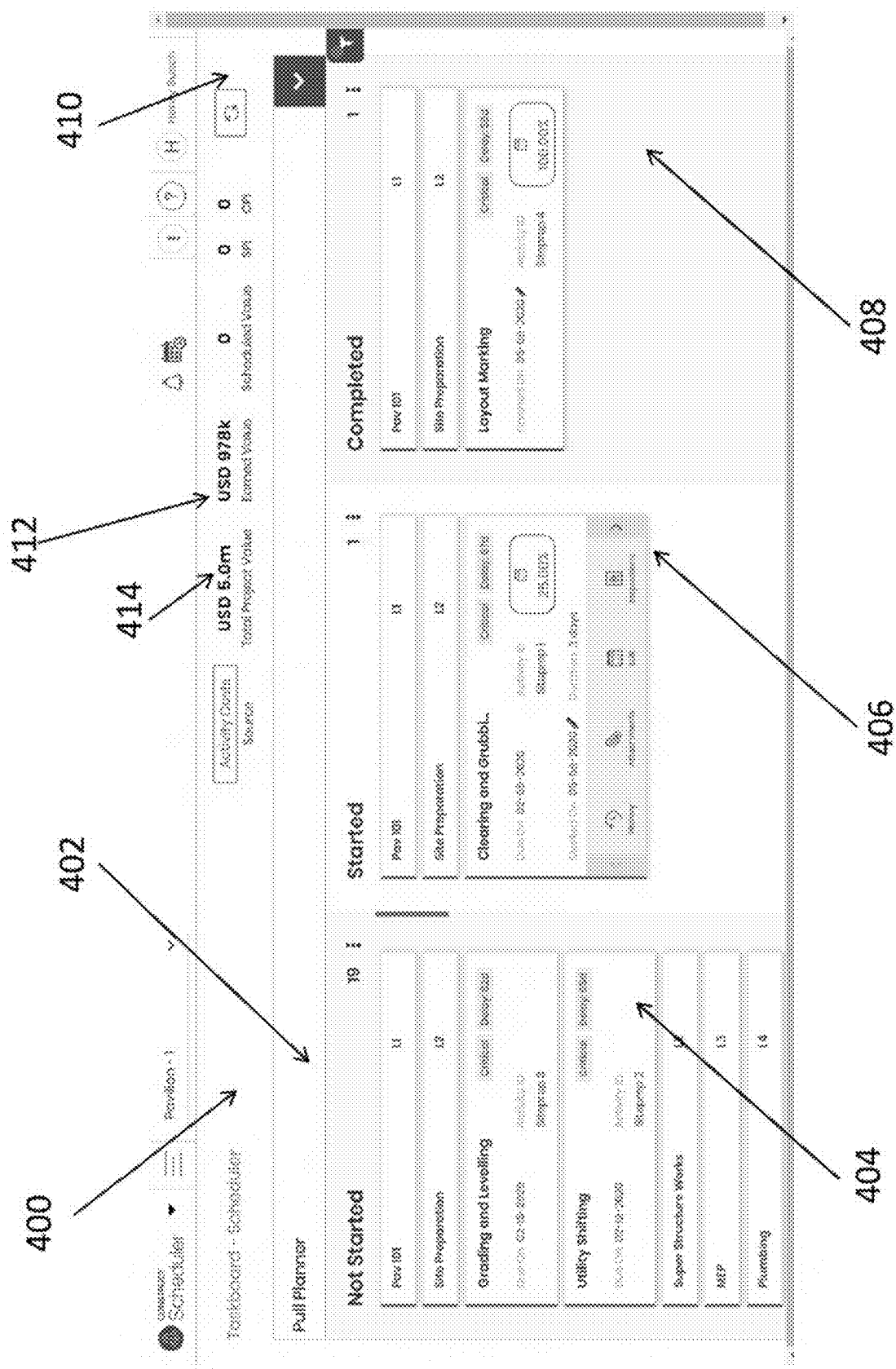
FIG. 4 is an illustration of a "Task Board" window of the scheduler application shown in FIG. 2.

FIG. 4 is an illustration of a task board 400 of the scheduler application 120. The task board 400 includes a planner 402 that includes a list 404 of tasks not started, a list 406 of tasks that have been started but are not completed, and a list 408 of tasks that have been completed. The task board 400 includes an overview 410 of a budget of the construction project. The overview 410 includes, for example, an earned value 412 and a total project value 414. The earned value 412 may be directed to how much has been spent on the construction project so far, and the total project value 414 may be directed to the total budget of the project. The overview 410 may be updated in real-time or near-real-time as the construct computing device 114 receives data that changes the overview 410 (e.g., regarding more money being spent and the total budget getting higher or lower).

Figure 5:
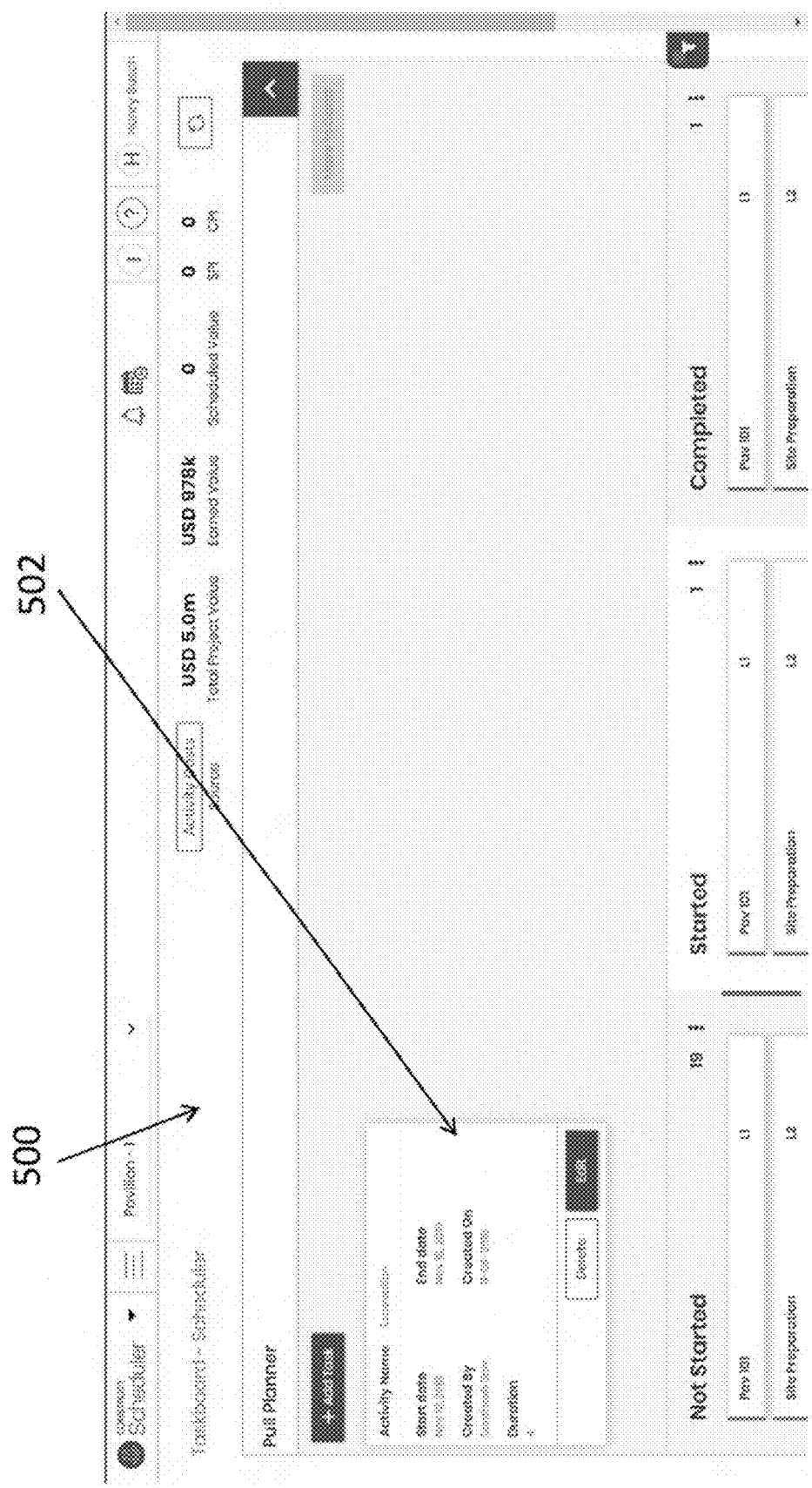
FIG. 5 is another illustration of a "Task Board" window of the scheduler application shown in FIG. 2.

FIG. 5 is another illustration of a task board 500 of the scheduler application 120. The task board 500 includes an "Add Task" window 502 that may allow the user to add an additional task not included in the schedule and/or the lists 404, 406, 408 of task board 400, shown in FIG. 4. That is, the window 502 allows the user to modify the schedule by adding a new task. In some embodiments, the added task may need to be approved by a supervisor before the task is added to the schedule, the schedule is modified, and other changes are made (e.g., to the budgeting and drawings) by the construct computing system 200.

Figure 6:
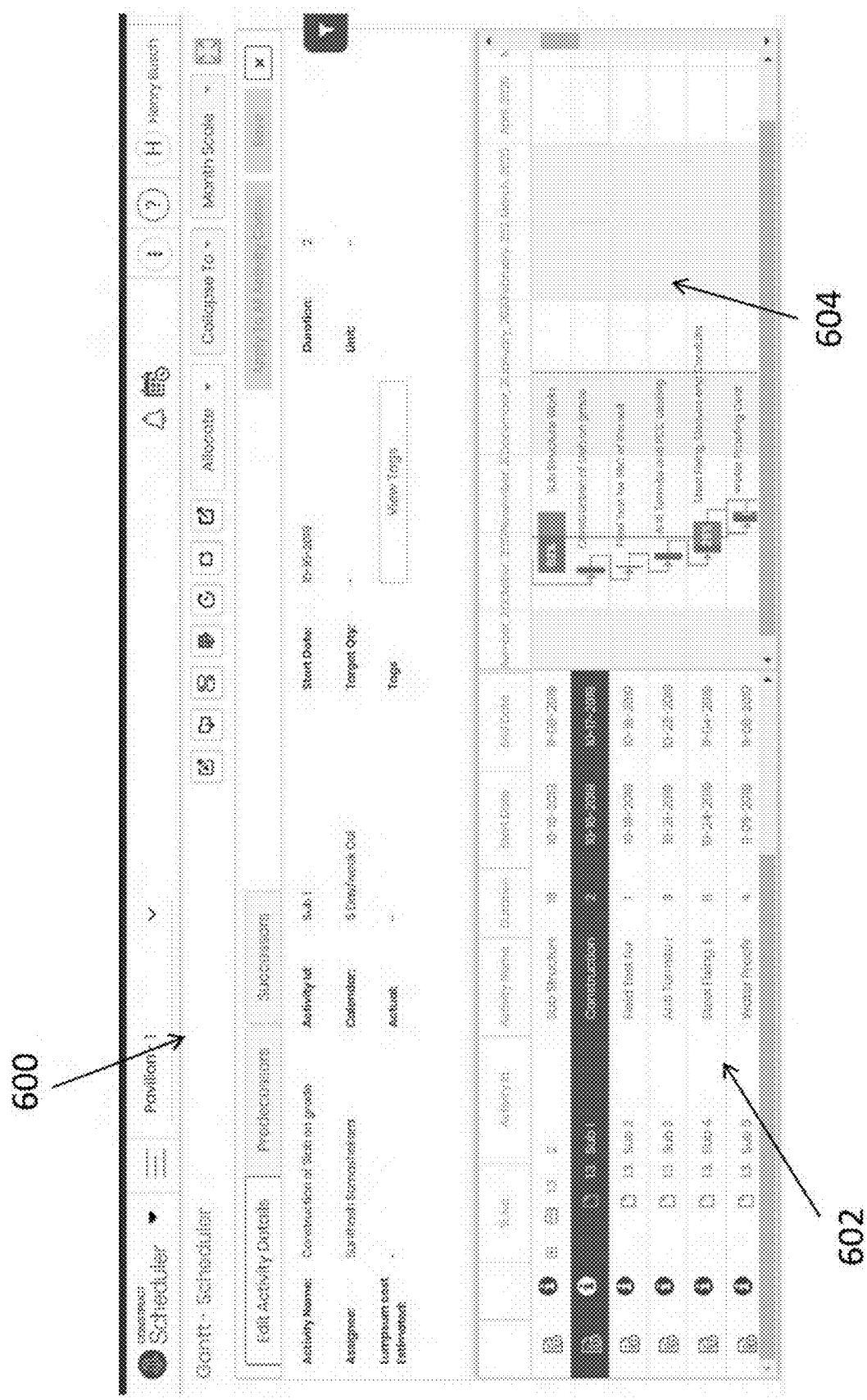
FIG. 6 is an illustration of a "Gantt Scheduler" window of the scheduler application shown in FIG. 2.

FIG. 6 is an illustration of a "Gantt Scheduler" window 600. The window 600 includes a list 602 of tasks and a Gantt schedule 604 associated with the list 602 of tasks. Specifically, the Gantt schedule 604 may be a bar chart that shows the schedule of the list 602 of tasks. Further, the Gantt schedule 604 may show relationships between the list 602 of tasks (e.g., how one task must be done before another or how two tasks have to be carried out at the same time) and the progress of each of the tasks of the list 602. The window 600 is one example of how the scheduler application 120 may display the schedule to the users.

Figure 7:
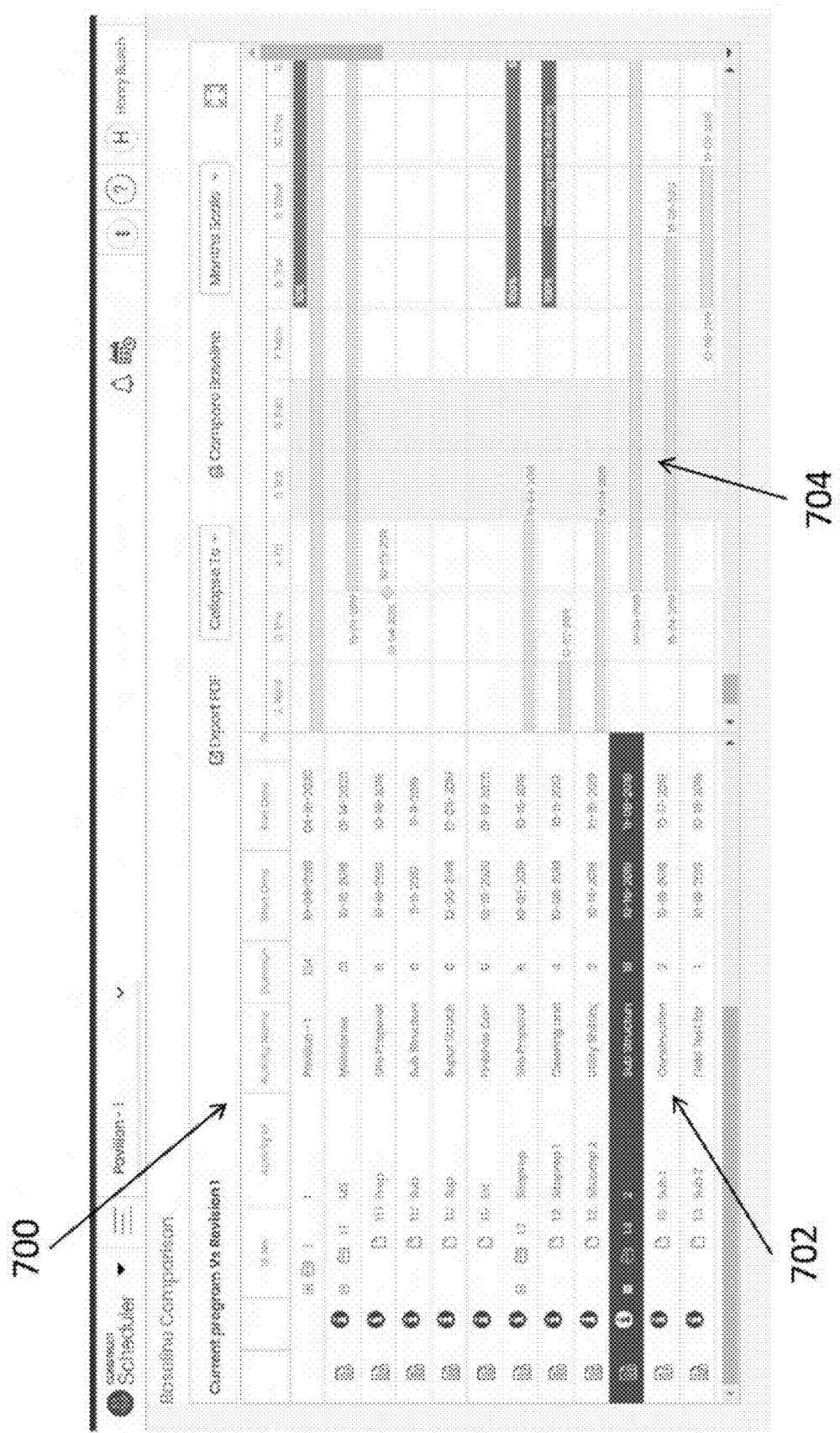
FIG. 7 is an illustration of a "Baseline Comparison" window of the scheduler application shown in FIG. 2.

FIG. 7 is an illustration of a "Baseline Comparison" window 700. The window 700 includes a list 702 of tasks and a Gantt schedule 704 that shows the progress of each of the tasks of list 702 in relation to a baseline. The baseline may be, for example, the original schedule generated by the construct computing system 200. The window 700 is another example of how the scheduler application 120 may display the schedule to the users.

Figure 8:
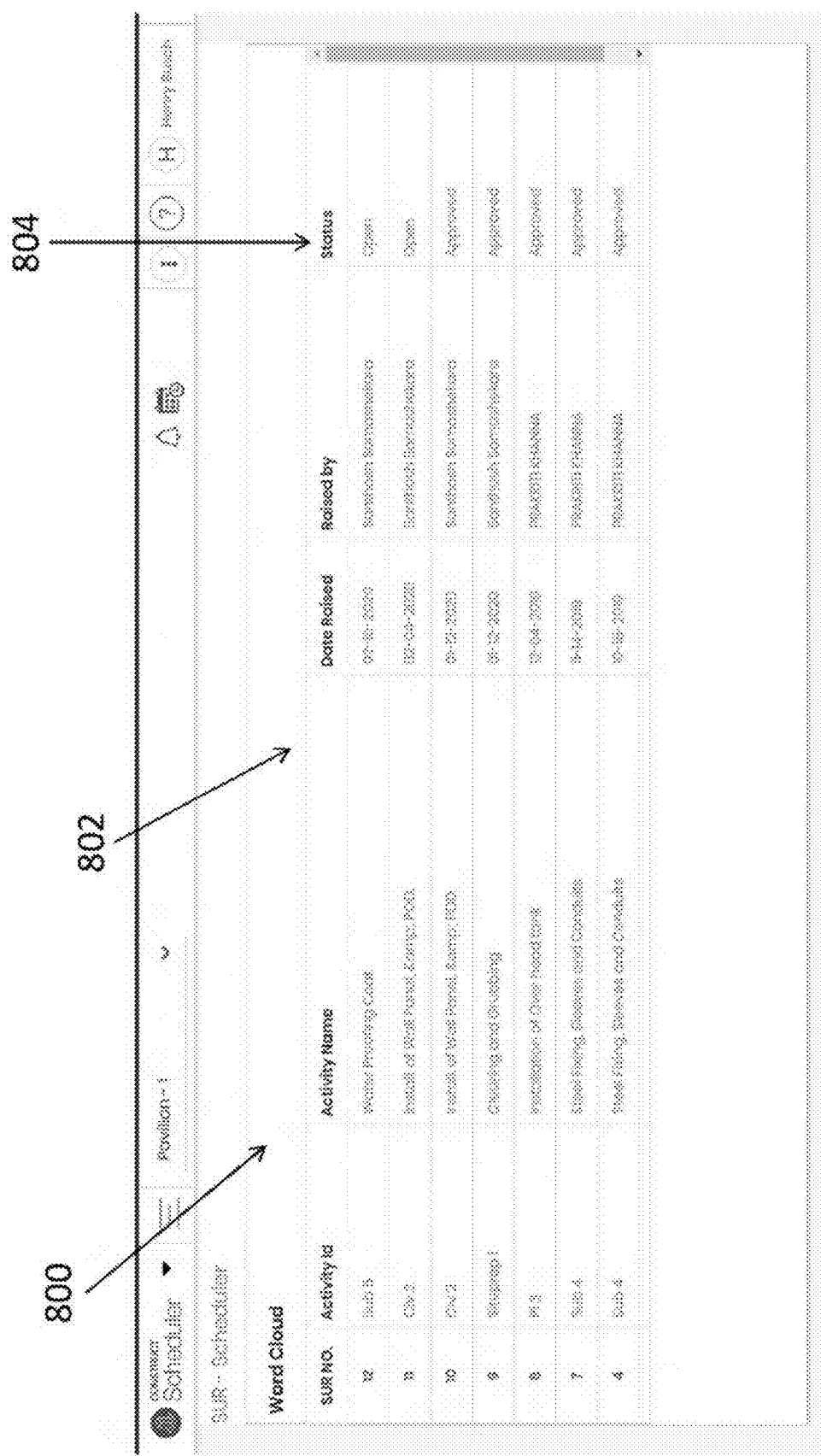
FIG. 8 is an illustration of a "Schedule Update Request (SUR)" window of the scheduler application shown in FIG. 2.

FIG. 8 is an illustration of a "Schedule Update Request (SUR)" window 800. The window 800 includes a list 802 of the schedule update requests (SURs) associated with the construction project. That is, the list 802 includes all of the schedule modifications (e.g., schedule modifications 126) input by users for the construction project. Further the list 802 includes a status 804 of each of the SURs. The status 804 may help supervising users determine if the supervising users need to approve any open SURs, and the status 804 may help users determine if the users need to remind their supervising users to approve the SURs.

Figure 9:
FIG. 9 is an illustration of a "Resource Manager" window of the scheduler application shown in FIG. 2.

FIG. 9 is an illustration of a "Resource Manager" window 900. The window 900 may be associated with the workforce system 116 (shown in FIG. 2) and displays workforce data to users. The workforce data included in the window 900 may be used by the scheduler application 120 to determine the schedule. The window 900 includes a list of the workforce needed for the construction project and information associated with the workforce. For example, the list may include a maximum amount of hours per day a worker can work, a type of the labor, a rate that the member of the workforce charges, and any other data relating to the workforce and how the workforce ties into the schedule and/or budget.

Budgeter Application

FIGS. 10-14 are illustrations of an exemplary embodiment of the budgeter application 122 displayed on a user interface. The user interface allows a user to operate the construct computing system 200, access data, and input modifications to the budget 130, as shown in the illustrations of the budgeter application 122. The user interface may be accessed on a computing device including a processor in communication with a memory. A user may input data and/or interact with the user interface using any suitable input device. For example, the computing device may include a computer mouse, a keyboard, and/or a touch screen which allows the user to select the icons and buttons.

Figure 10:
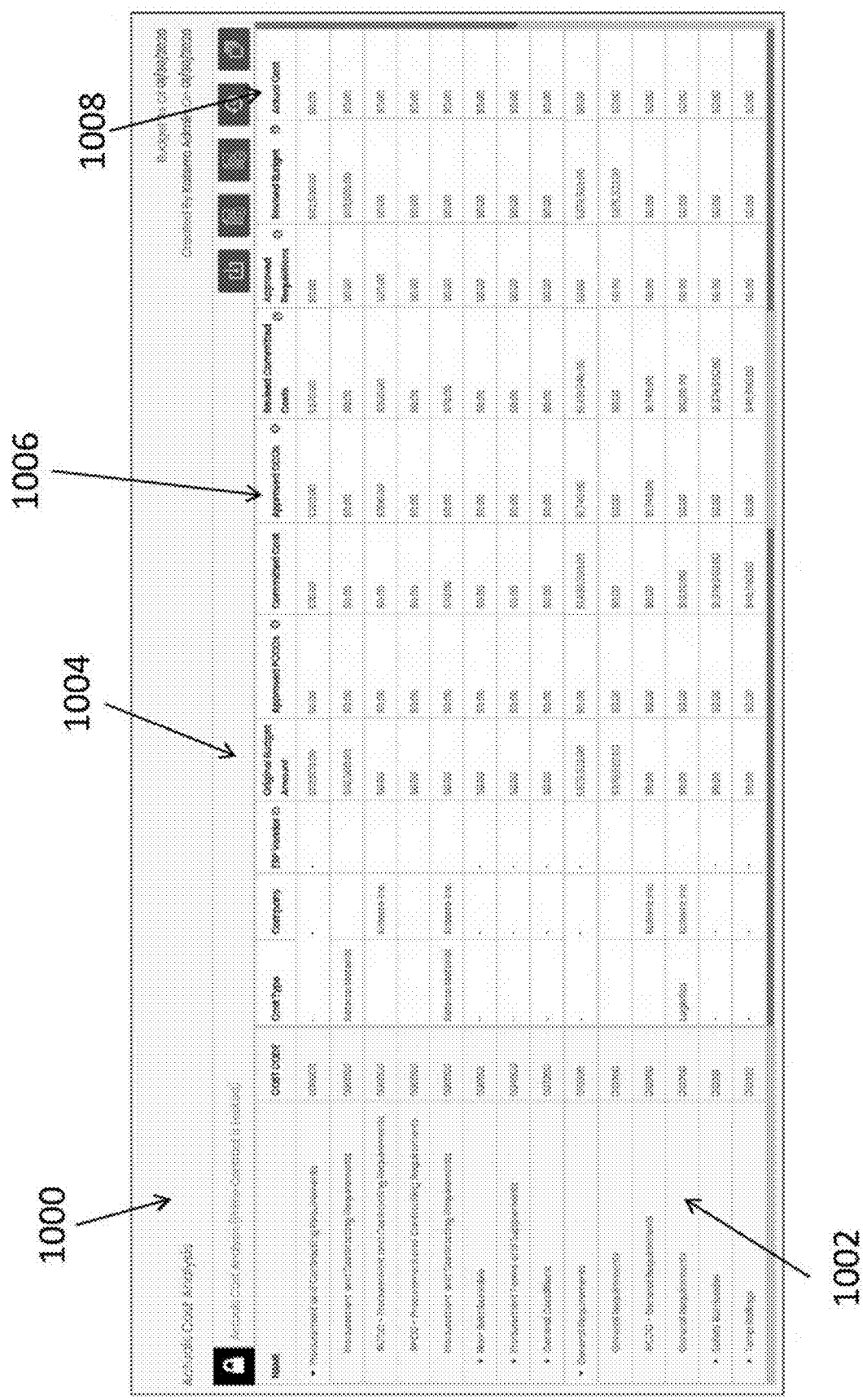
FIG. 10 is an illustration of an "Actual Cost Analysis" window of the budgeter application shown in FIG. 2.

FIG. 10 is an illustration of an "Actual Cost Analysis" window 1000. The window 1000 includes a list 1002 of tasks and actual budgeting data associated with each task of the list 1002. For example, the actual budgeting data includes an allocated cost 1004 associated with the task, a change cost 1006 associated with the task, and an actual cost 1008 associated with the task. The allocated cost 1004 may be the cost originally allocated in the budget to the task. The change cost 1006 may be the cost associated with any changes made to the task (e.g., additional workforce or materials to complete the task). The actual cost 1008 of the task may be how much the task actually cost (e.g., including any change costs). The window 1000 is an example of how the budgeter application 122 may display the budget to the users.

Figure 11:
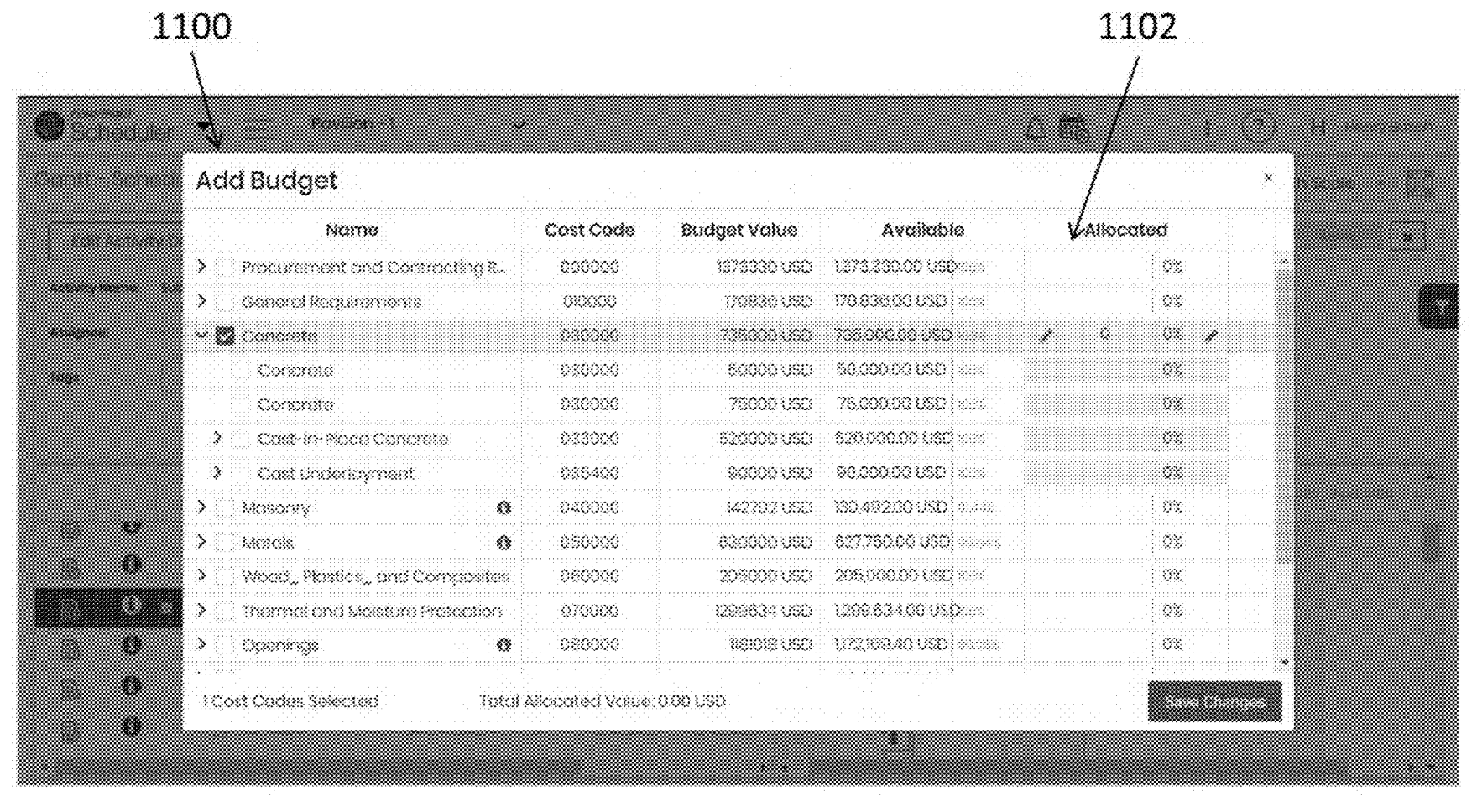

FIG. 11 is an illustration of an "Add Budget" window 1100. The window 1100 includes a budget modification window 1102 where users can input budget modifications (e.g., budget modifications 132). For example, the budget modification window 1102 may allow the user to change an allocation of the budget associated with different categories of the construction project (e.g., materials including concrete, masonry, metals, etc.), change specific amounts allocated to the different categories, and carry out any additional modifications to the budget. The window 1100 shows an example of how users may input budget modifications 132 into the budgeter application 122.

Figure 12:
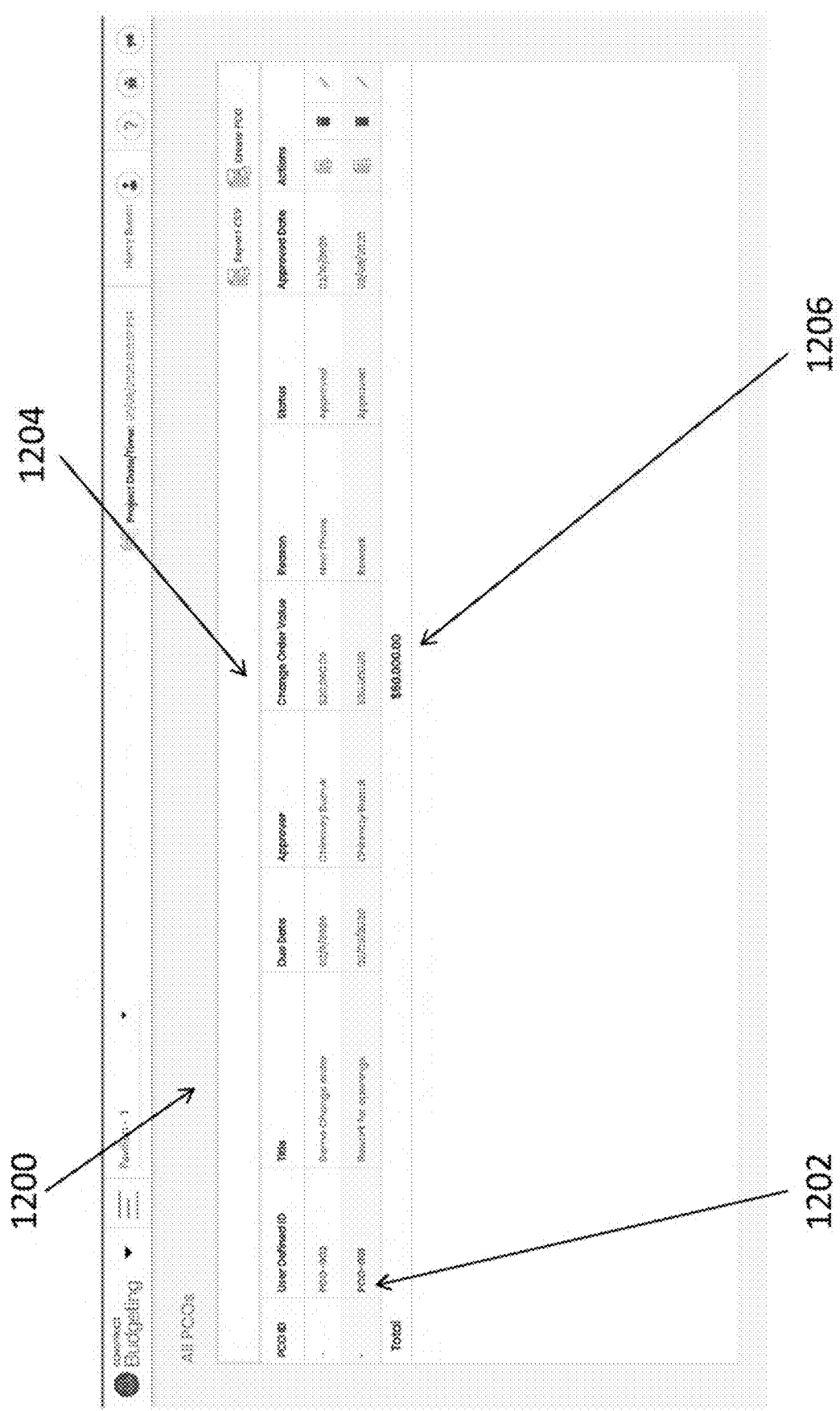
FIG. 12 is an illustration of a "Potential Change Orders" window of the budgeter application shown in FIG. 2.

FIG. 12 is an illustration of a "Potential Change Orders" window 1200. The window 1200 includes a list 1202 of potential change orders (e.g., pending budget modifications 132), a value or cost 1204 associated with each potential change order of the list 1202, and a total cost 1206 of all of the potential change orders of the list 1202. The window 1200 may assist users in approving or denying the potential change orders by allowing the users to see the cost 1204 associated with the potential change orders.

Figure 13:
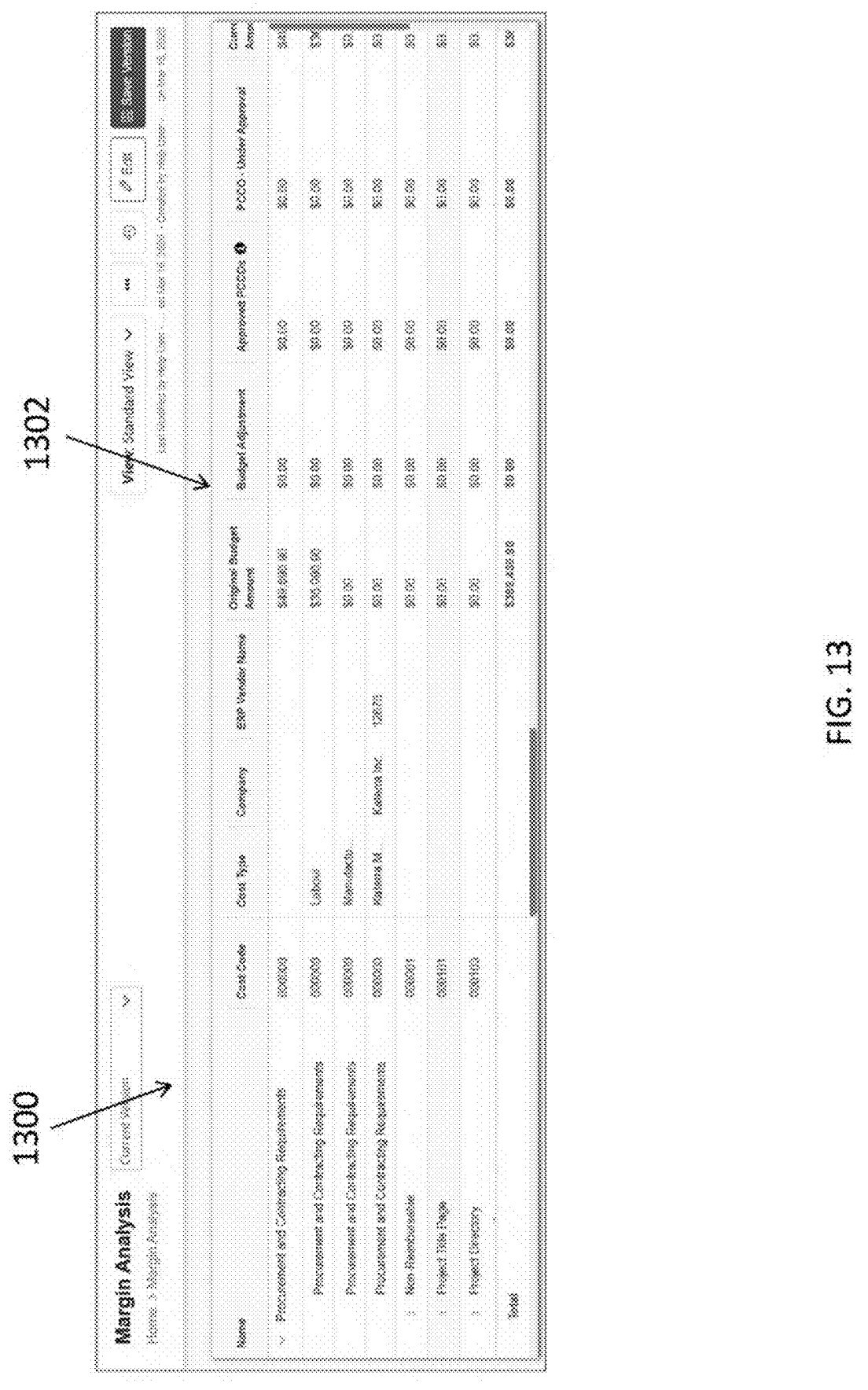

FIG. 13 is an illustration of a "Margin Analysis" window 1300. The window 1300 includes the margin analysis 1302 of the tasks of the construction project over time. That is, the margin analysis 1302 displays the original budget amount (e.g., as included in the budget 130) for each category of the budget (e.g., procurement and contracting, non-reimbursable items, project costs, etc.), any budget adjustments made throughout the construction project, any approved change orders that affected the budget, any potential change orders that affect the budget, and any other budget information associated with margin analysis. The window 1300 and the margin analysis 1302 are examples of how the budget of the construction project may be displayed to users through the budgeter application 122 such that the users can monitor the budget throughout the course of the construction project.

Figure 14:
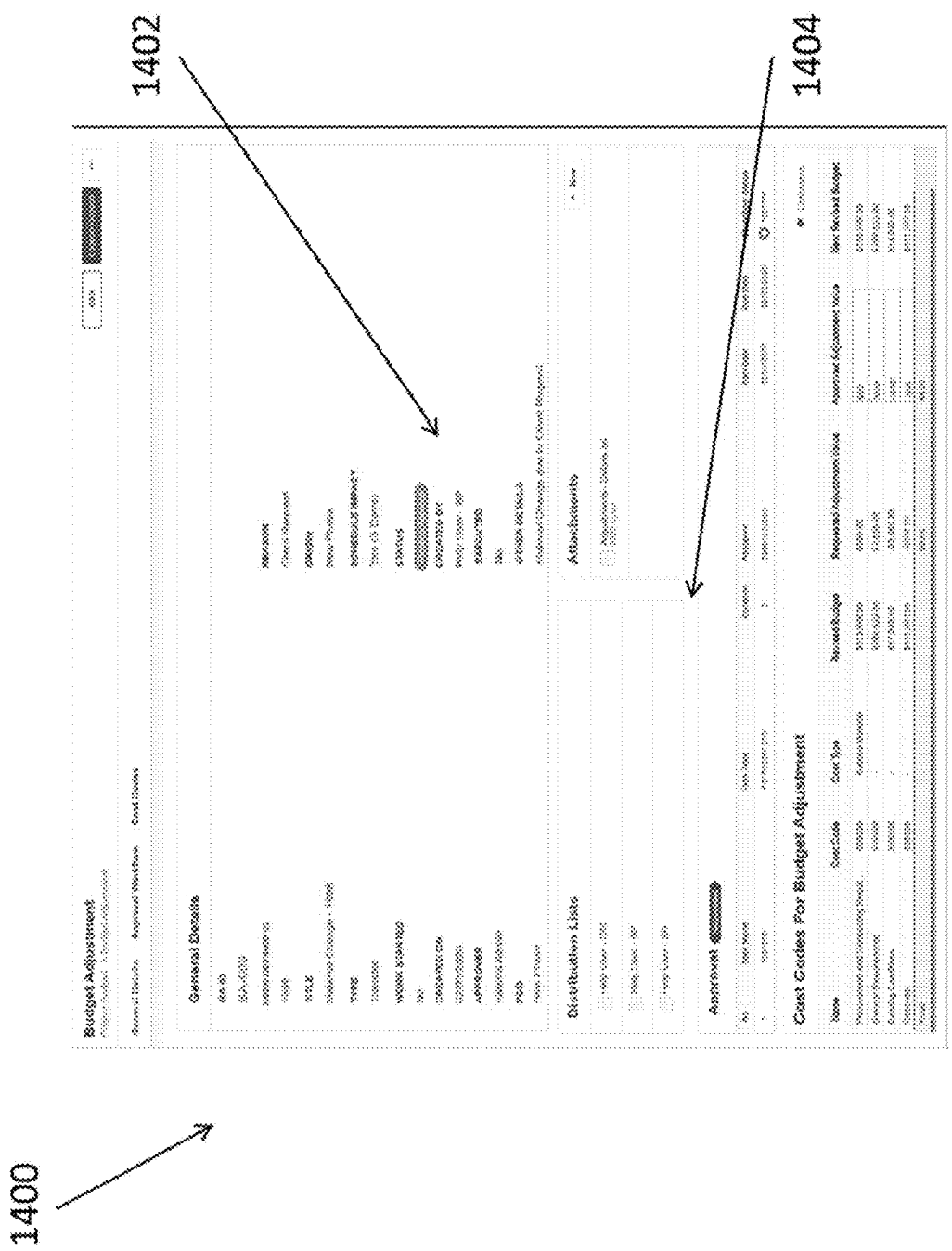
FIG. 14 is an illustration of a "Budget Adjustment" window of the budgeter application shown in FIG. 2.

FIG. 14 is an illustration of a "Budget Adjustment" window 1400. The window 1400 illustrates an example screen of how a user can manually make a budget modification (e.g., budget modification 130 shown in FIG. 3B). The window 1400 includes details 1402 associated with the budget adjustment and links 1404 that the user may link to the budget adjustment. The details 1402 of the budget adjustment included in the window 1400 include a reason for the budget adjustment (e.g., a materials change), a date the adjustment was created on, whether work has been started on the task associated with the adjustment (e.g., the user may input whether the work has been started or the construct computing system 200 shown in FIG. 3A may determine whether the work has been started and populate the corresponding field of the adjustment), whether the adjustment has been approved, a reason for the adjustment, a schedule impact (e.g., the user may determine the schedule impact or the construct computing system 200 may determine the schedule impact based upon the adjustment), a status of the adjustment, a user the adjustment was created by, and any other information associated with adjustment. The budget adjustment may be stored by the construct computing system 200 (e.g., in database 242) such that a log of the adjustments, reasons for the adjustments, approvals of the adjustments, etc. may be referenced at future times.

Figure 15:
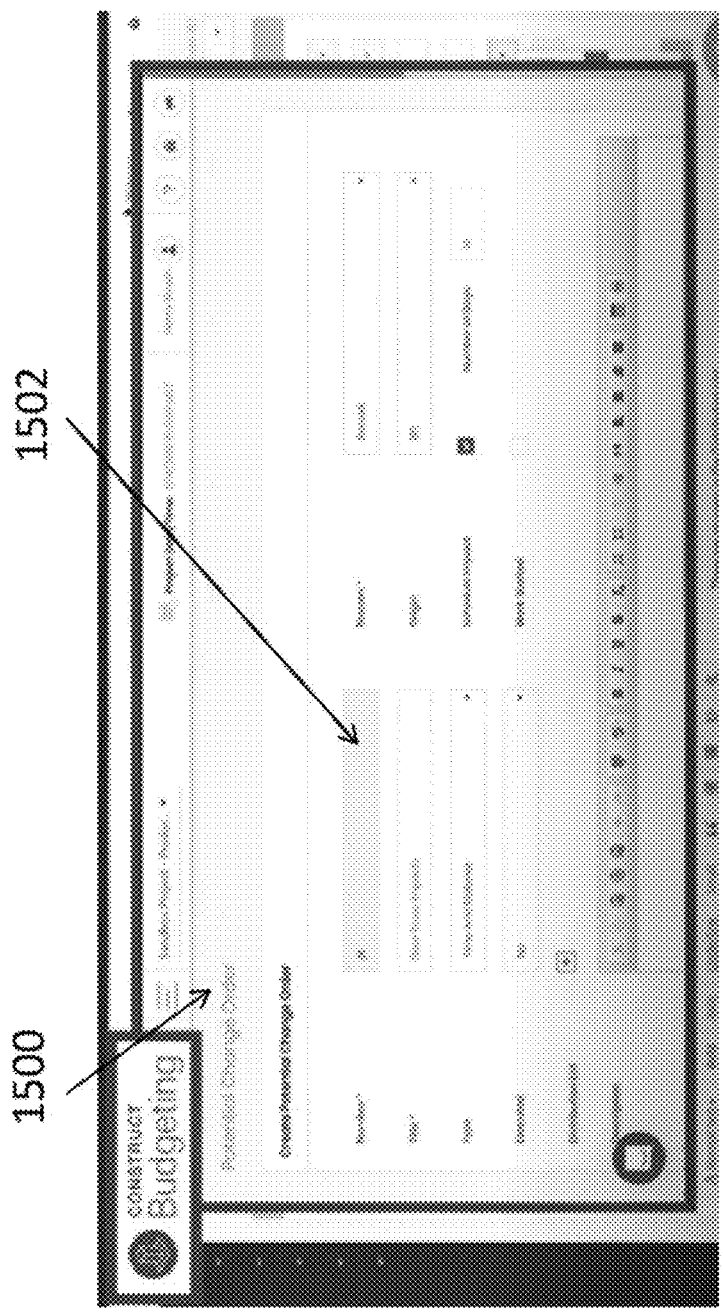
FIG. 15 is an illustration of a "Drawing Change Order" window of the budgeter application shown in FIG. 2.

FIG. 15 is an illustration of a "Drawing Change Order" window 1500 for modifying the budget 130. The window 1500 includes fields 1502 that a user may fill out about a change order the user wishes to make to the budget 130. The fields 1502 may include, for example, a title of the change order, a type of the change order, whether the change order has been executed, a distribution list associated with the change order, a description of the change order, a reason for the change order, the origin of the change order, a schedule impact of the change order, a number of days the change order may take, whether the work has been started, and any other fields that may be relevant to the change order. In some embodiments, the construct computing system 200 automatically populates one or more of the fields 1502 based upon what is being changed in the change order. In other embodiments, the user populates the fields 1502.

Drawings Application and Functionality

FIGS. 16-26 are illustrations of an exemplary embodiment of the drawings application 118 displayed on a user interface. The drawings application 118 displays the drawings 136 for the construction project such that users can easily interact with and modify the construction drawings directly through the user interface, as shown in the illustrations of the drawings application 118. The user interface allows a user to operate the construct computing system 200, access data, view drawings 136, and input modifications to the drawings 136. The user interface may be accessed on a computing device including a processor in communication with a memory. A user may input data and/or interact with the user interface using any suitable input device. For example, the computing device may include a computer mouse, a keyboard, and/or a touch screen which allows the user to select the icons and buttons.

Figure 16:
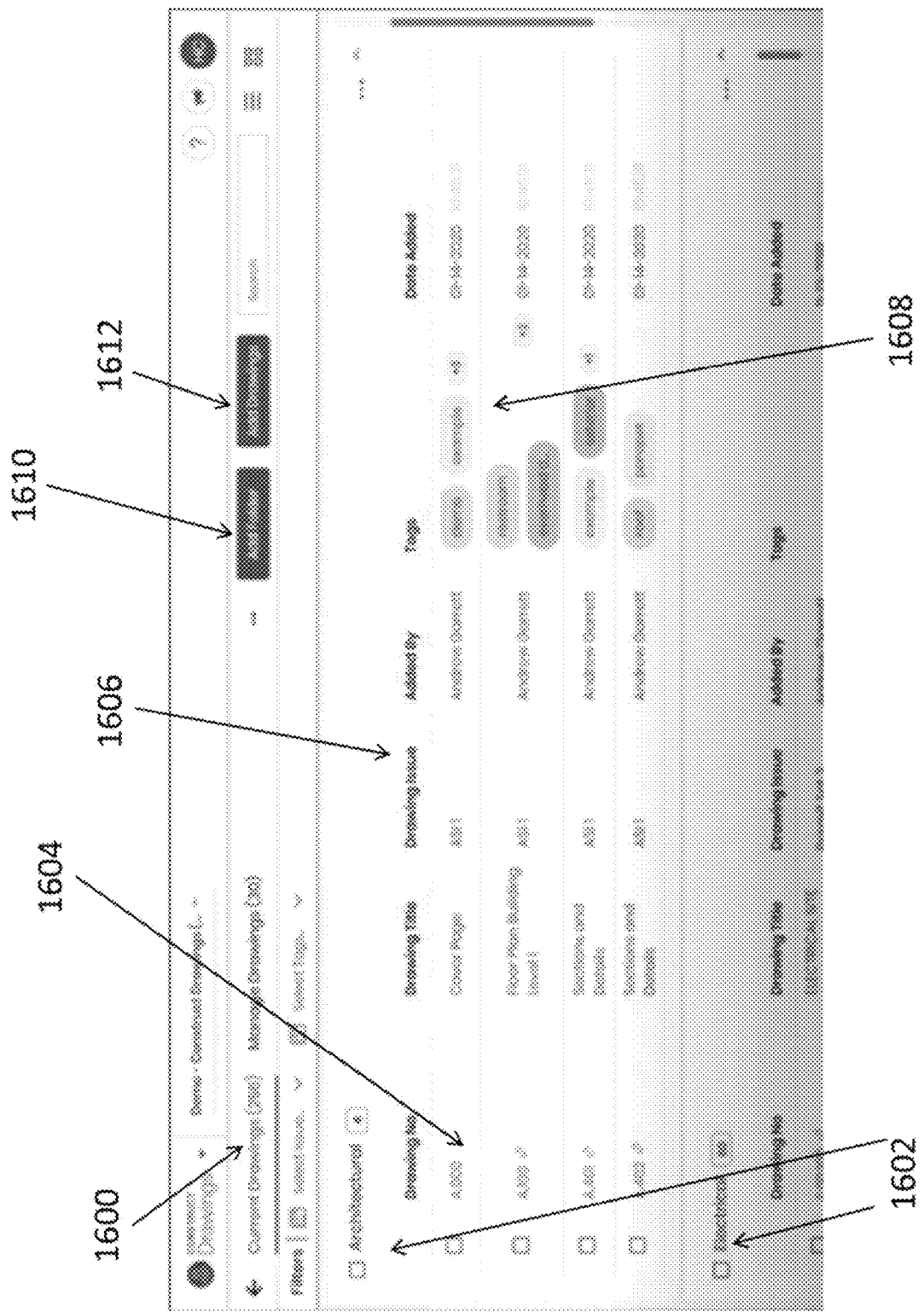
FIG. 16 is an illustration of a drawing landing page of the drawings application shown in FIG. 2.

FIG. 16 displays an exemplary drawing landing page 1600 of the drawing module 118 displayed on a user computing device. The drawing landing page 1600 includes folders 1602 of drawings. The folders 1602 organize the drawings by a category the drawings are associated with (e.g., architectural or electrical).

In each folder 1602 are links 1604 to the drawings included in the folders 1602. The links 1604 include the unique name of the drawings and, when pressed, direct the user interface to a display of the drawing. Each drawing includes drawing information 1606 associated with the drawing. Drawing information 1606 includes, for example, the title of the drawing, a name of the user that added the drawing, the date the drawing was added, etc. Further, each drawing may include one or more tags 1608. The tags 1608 may label a group of which the drawings are a part (e.g., first restroom, kitchen, bedroom, etc.), or any other information relevant information about the drawing.

Further, the landing page 1600 includes a tool bar including an "add new folder" button 1510 and an "add new drawing button" 1612. The button 1610, when pressed, allows the user to add a new drawings folder 1602 to the landing page 1600. The button 1612, when pressed, allows the user to add a new drawing link 1604 to the landing page 1600. For example, the button 1612 may allow the user to upload a new drawing stored locally, access and upload a new drawing from a cloud storage database, or create a new drawing.

Figure 17:
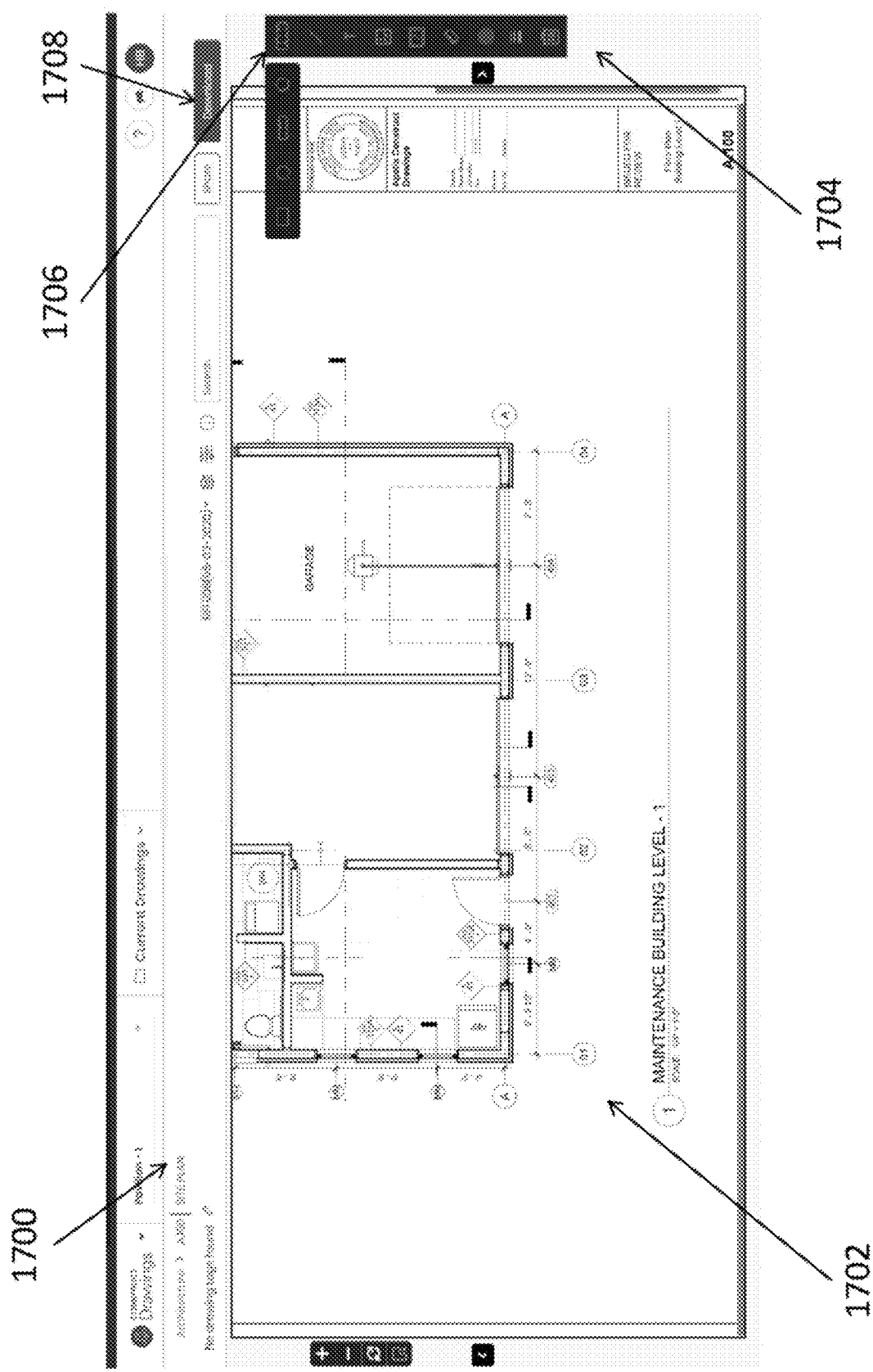
FIG. 17 is an illustration of a "View Drawing" window of the drawings application shown in FIG. 2.

FIG. 17 shows a drawing view page 1700. The drawing view page displays a drawing 1702 (e.g., when the drawing link 1604 of the drawing landing page 1600 is pressed). The drawing view page 1700 includes a toolbar 1704 that includes multiple buttons 1706. Buttons 1706 may allow the user to input modifications (e.g., modifications 138, shown in FIGS. 3A and 3B) to the drawing 1702. For example, buttons 1706 may include a measurement button, a calibration button (e.g., for calibrating drawing measurements), an annotation button (e.g., that allows users to directly annotate the drawing 1702), a link button (e.g., that allows users to link documents, pictures, requests for information, RFIs, etc. to the drawing 1702), or buttons associated with any of the modifications 138 described herein.

Further, drawing view page 1700 includes a download button 1708 that, when pressed, allows the user to download the drawing 1702 to the user computing device used to access the drawings application. For example, if a user does not have access to internet, the user can download the drawing 1702 to the user computing device such that the user can still access the drawing 1702 without internet access. When the drawing 1702 is downloaded, the construct computing device 114 may store the drawing 1702 in a memory (e.g., memory 252, shown in FIG. 28) of the user computing device.

Figure 18:
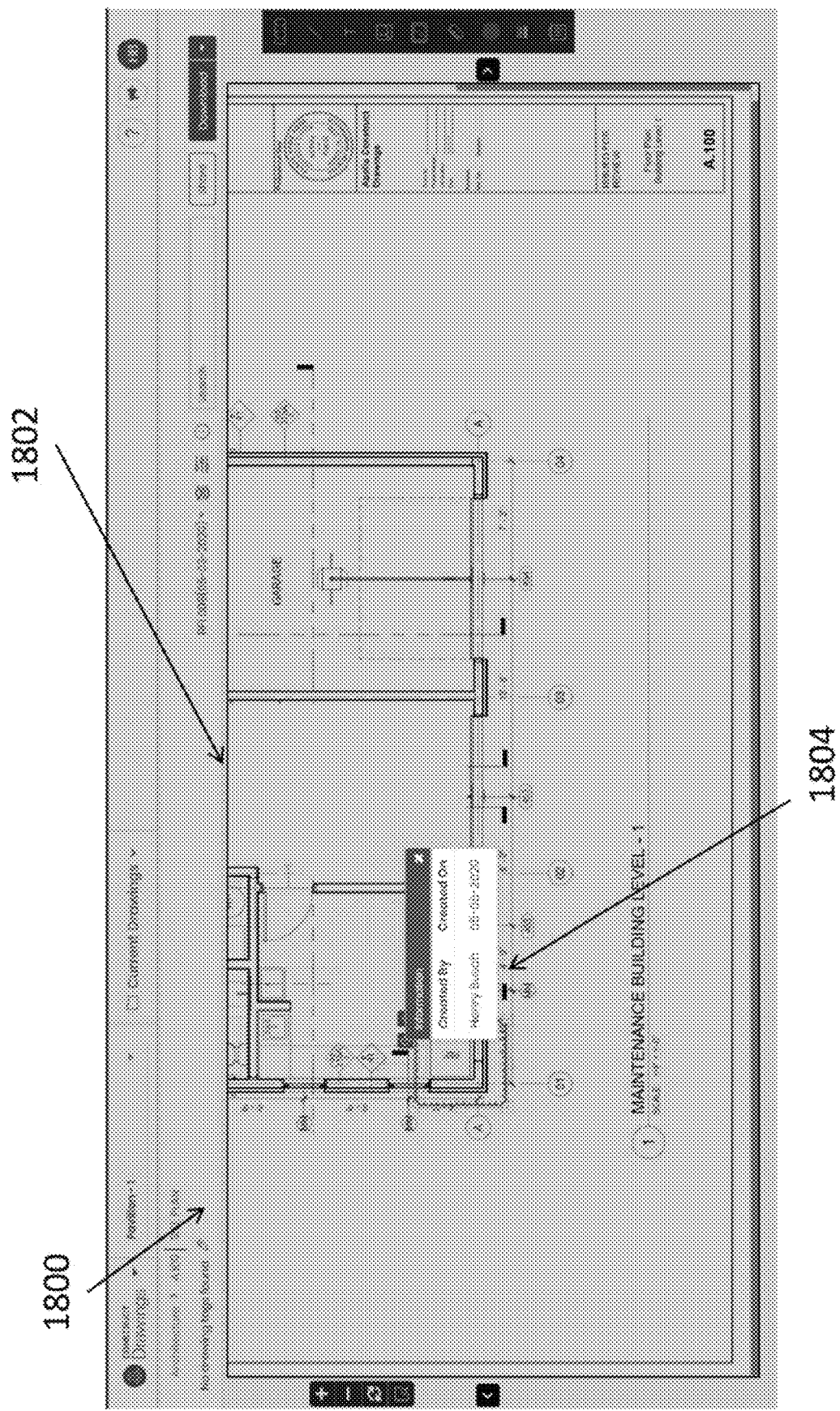
FIG. 18 is an illustration of an "Annotate Drawing" window of the drawings application shown in FIG. 2.

FIG. 18 shows an illustration of an "Annotate Drawing" window 1800. The window 1800 includes a drawing 1802 and an annotation 1804 to the drawing 1802. The annotation 1804 may be added to the drawing 1802 when, for example, the user presses an annotation button (as shown as buttons 1706 in FIG. 17). In the window 1800, the annotation 1804 is an emphasis on an aspect of the drawing 1802, and in some embodiments, the annotation 1804 includes a comment about the aspect. Once the annotation 1804 is added to the drawing 1802, the annotation 1804 is stored as part of the drawing 1802. Accordingly, each time the user views the drawing 1802, the annotation 1804 is also displayed. Further, when other users view the drawing 1802, the annotation 1804 is also displayed to the other users as part of the drawing 1702.

Figure 19:
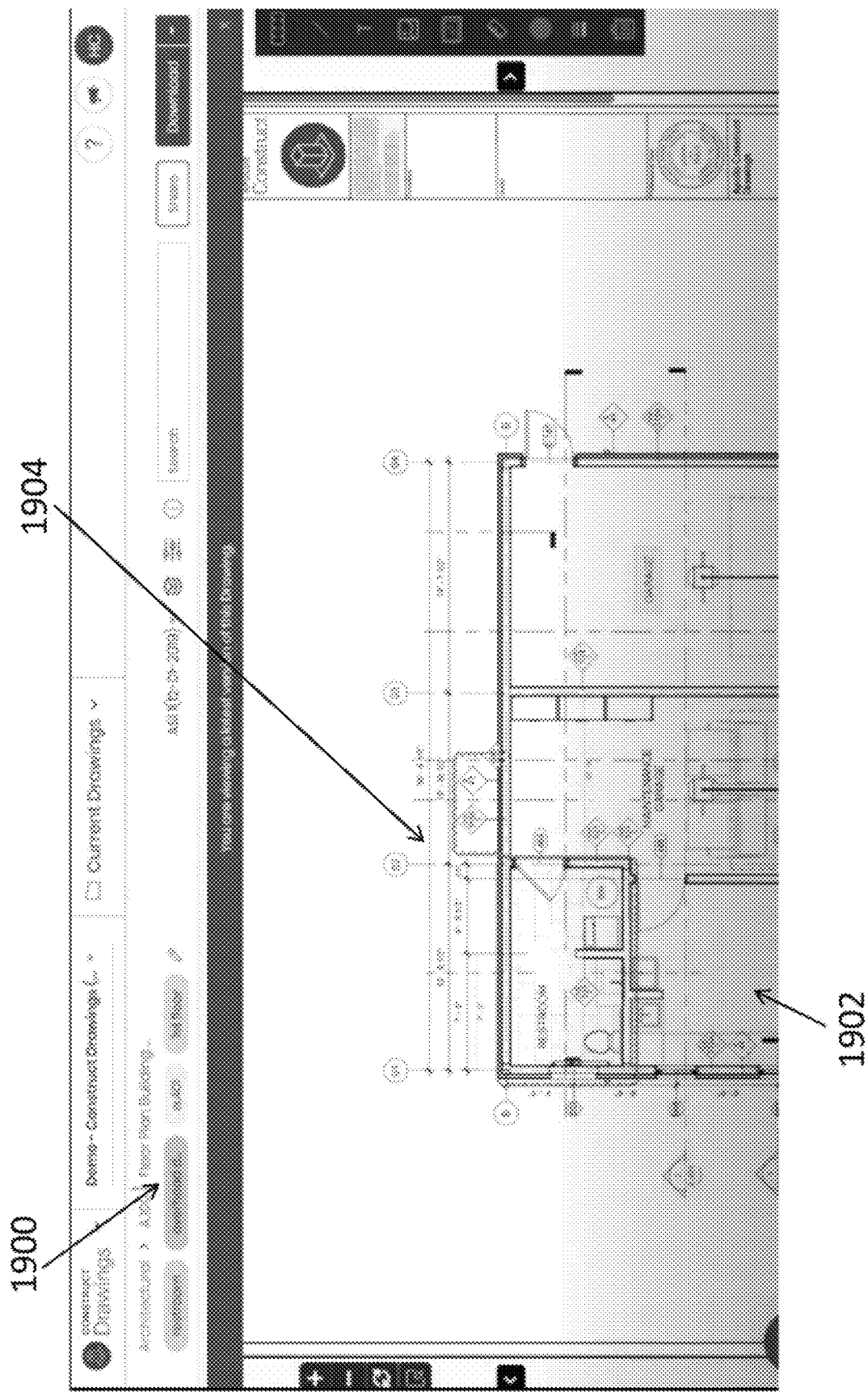
FIG. 19 is an illustration of a "Drawing Mark-Up" window of the drawings application shown in FIG. 2.

FIG. 19 is an illustration of a "Drawing Mark-Up" window 1900. The window 1900 includes a drawing 1902 and multiple annotations 1904. The annotations 1904 may have been made by one user or a plurality of users. The annotations 1904, like the annotations 1804 of FIG. 18, are stored as part of the drawing 1902 and can be viewed by any users when the users are viewing the drawing 1902.

Figure 20:
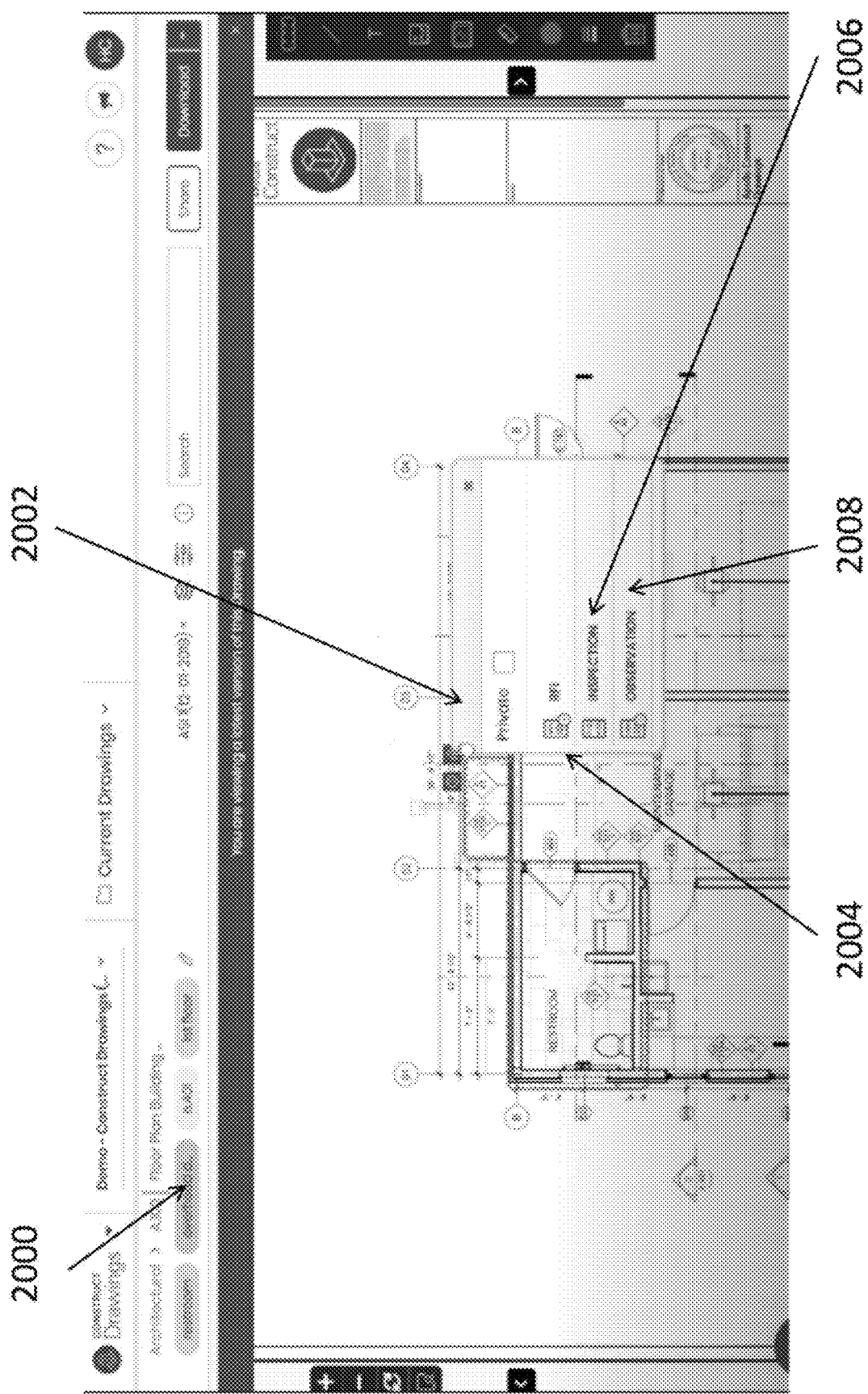
FIG. 20 is an illustration of a "Drawing Mark-Up" window of the user drawings application shown in FIG. 2 including creating a link to the drawing shown in the window.

FIG. 20 is an illustration of a "Drawing Mark-Up" window 2000. The window 2000 shows how a link 2002 can be linked to the drawing through the drawing application 118. The user may choose to link a request for information (RFI) 2004 (e.g., a query about a certain aspect of the drawing to be answered by a supervising user, such as a project manager, or another user, like a client user), an inspection request 2006 (e.g., to have the part of the construction project illustrated in the drawing inspected by a supervising user or a third party inspector), and/or an observation 2008 (e.g., a safety observation or any other observation that is associated with the drawing). For example, the user may link an RFI 2004 to the drawing inquiring about a certain aspect of the drawing that is not clear to the user. Once the project (e.g., a room, floor, or certain part of a room or floor) illustrated in the drawing is complete, the user may link an inspection request 2006 to the drawing indicating that the project is complete and needs to be inspected. Further, the user may link a safety observation 2008 to the drawing if it is deemed that any part of the project illustrated in the drawing is unsafe or hazardous (e.g., if there are very sharp corners, low ceilings or beams, unsafe electrical wiring, etc.). Once the user links one or more of the RFI 2004, the inspection request 2006, and the observation 2008, the link 2002 is connected with the drawing (e.g., by storing the RFI 2004, inspection request 2006, and/or observation 2008 in the database 242 shown in FIG. 3A with the drawing) such that each time the drawing is displayed, the link 2002 is also displayed to any user viewing the drawing.

Figure 21:
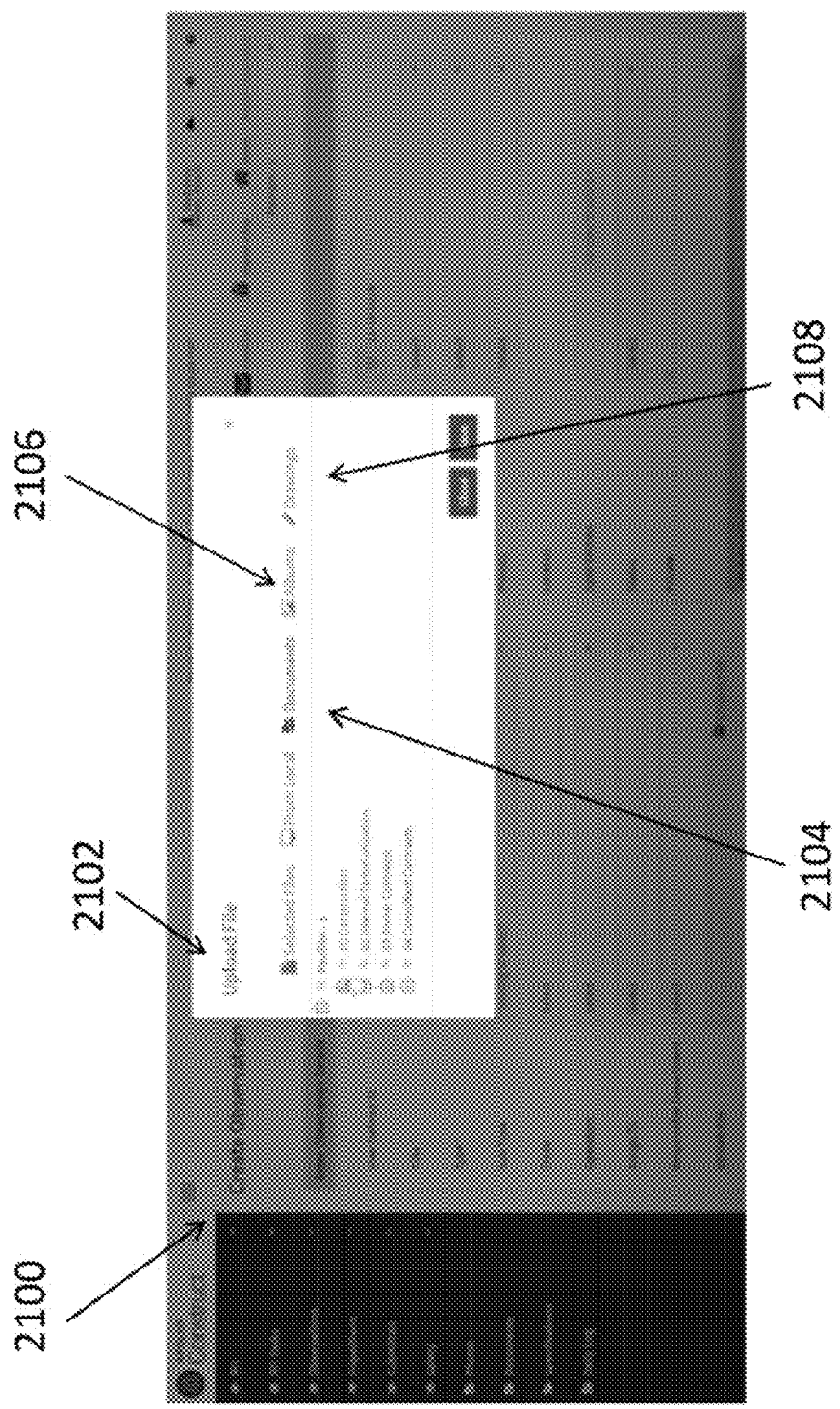
FIG. 21 is an illustration of a "Drawing Link" window of the drawings application shown in FIG. 2.

FIG. 21 is an illustration of a "Drawing Link" window 2100. The window 2100 shows an example of some of the options 2102 that can be linked to a drawing. The options 2102 include, for example, linking local documents 2104 to the drawings (e.g., documents stored locally on the user computing device), linking local pictures 2106 (e.g., pictures stored locally on the user computing device) to the drawings, and linking other drawings 2108 (e.g., associated with the construction project) to the drawings. For example, the user may wish to link a local document 2104 to the drawing if the user has notes about the drawing or other relevant documents to the drawing that the user would like to reference or allow other users to reference when the other users view the drawing. The user may wish to link a local picture 2106 to the drawing if, for example, the user wishes to document the progress of the project illustrated in the drawings, document any problems associated with the construction of project, and/or document how an aspect of the project should look in reality. Further, for example, the user may wish to link other drawings 2108 to the drawing if the other drawings 2108 are relevant to the drawing such that the user and other users are easily able to switch between the drawings and see which other drawings 2108 are relevant to the drawing. The window 2100 illustrates how users may browse the different options 2102 and select the documents the users would like to link to the drawings.

Figure 22:
FIG. 22 is an illustration of a "Drawing RFI Link" window of the drawings application shown in FIG. 2.

FIG. 22 is an illustration of a "Drawing RFI Link" window 2200. The window 2200 may be displayed (e.g., by the drawings application 118) if, for example, the user selects that an RFI 2004 (shown in FIG. 20) should be linked to the drawing. The window 2200 includes fields 2202 that a user may fill out about the RFI 2004 that the user wishes to link to the drawing. The fields may include, for example, a user ID, a priority of the RFI 2004 (e.g., if the RFI 2004 is urgent), a subject of the RFI 2004, a cost impact (e.g., on the budget 130) of the RFI 2004, a location, whether the RFI 2004 is private or public, any files that should be attached to the RFI 2004, a schedule impact (e.g., to the schedule 124) of the RFI 2004, a user to which the RFI 2004 should be assigned, questions that should be included in the RFI 2004, and any other fields 2202 that are relevant to the RFI 2004. In some embodiments, the construct computing system 200 may automatically populate one or more of the fields 2202. In other embodiments, user populates each of the fields 2202.

RFIs 2004 may resolve gaps, conflicts, and/or ambiguities in the drawings. Accordingly, the ability to link the RFI 2004 to the drawing allows each user to easily access the RFI 2004 and an answer to the RFI 2004 such that all users may consistently interpret the drawings. Further, linking the RFI 2004 directly to the drawing ensures that the query of the RFI 2004 only has to be answered once to reach all of the users.

Figure 23:
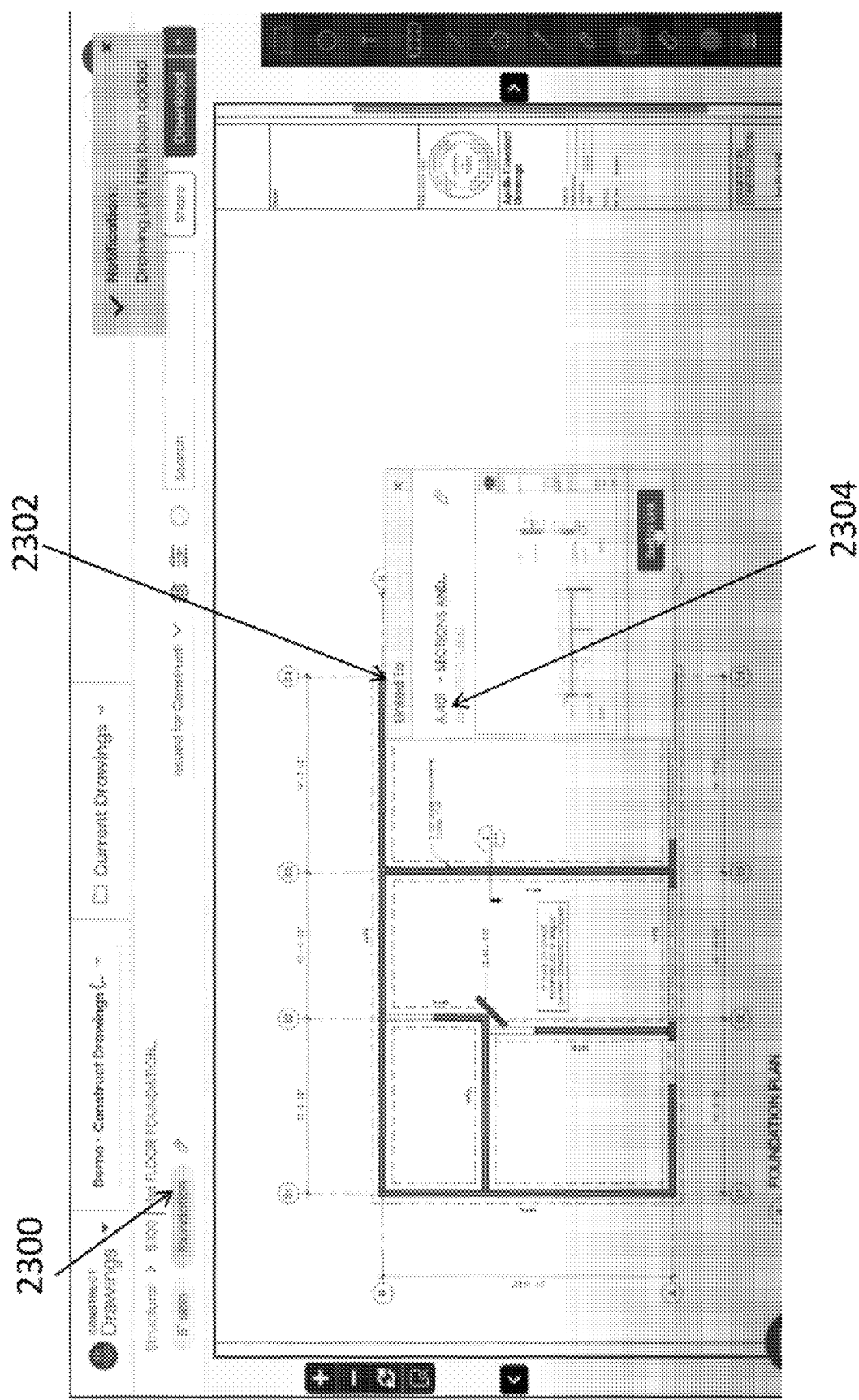
FIG. 23 is an illustration of a window allowing users of the drawings application shown in FIG. 2 to link drawings together.

FIG. 23 is an illustration of a window 2300 showing that other drawings of the construction project are linked to the current drawing illustrated in the window 2300 (e.g., when a user chooses to link drawings 2108 shown in FIG. 21 to the current drawing). The window 2300 includes a box 2302 showing to which other drawings associated with the construction project the current drawing is linked. The box 2302 includes links 2304 to the linked drawings that, when pressed, may cause the drawings application 118 to display the linked drawing. Linking one or more drawings that are associated with one another together, as shown in the window 2300, allows the users to quickly switch between the associated drawings (e.g., if the user requires more information or another view of the current drawing).

Figure 24:
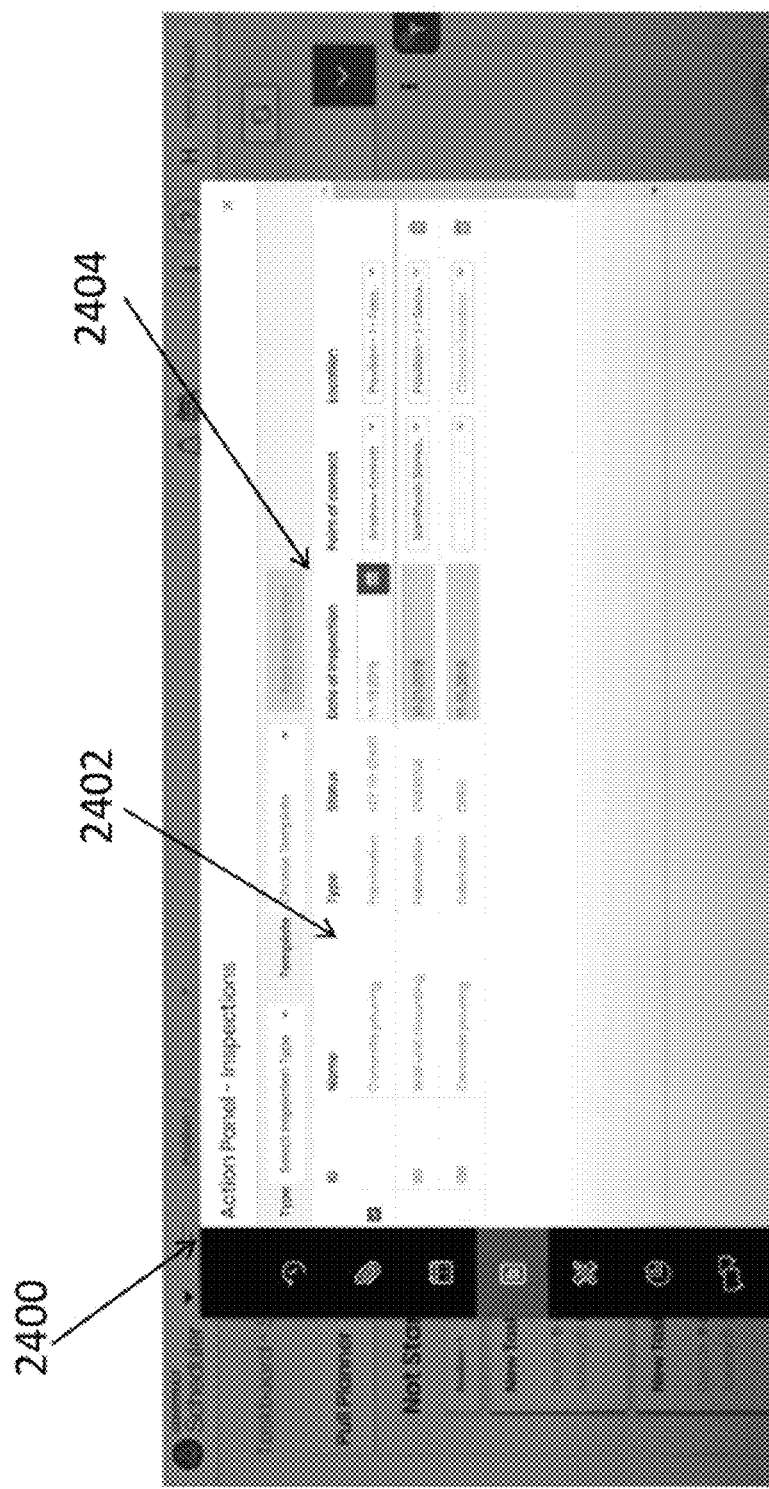
FIG. 24 is an illustration of an "Inspection Action Panel" window of the drawings application shown in FIG. 2.

FIG. 24 is an illustration of an "Inspection Action Panel" window 2400. The window 2400 may be displayed (e.g., by the drawings application 118) if, for example, the user selects that an inspection 2006 (shown in FIG. 20) should be linked to the drawing. The window 2400 includes inspection information 2402 and a link 2404 to a calendar and/or the scheduler application 120 such that the inspection task can be created through the scheduler application 120 and also linked to the drawing through the drawings application 118. Accordingly, the inspection may be linked to the drawing and added as a task of the schedule 124. The schedule 124 may be modified by the construct computing system 200 based upon the inspection linked to the drawing.

Figure 25:
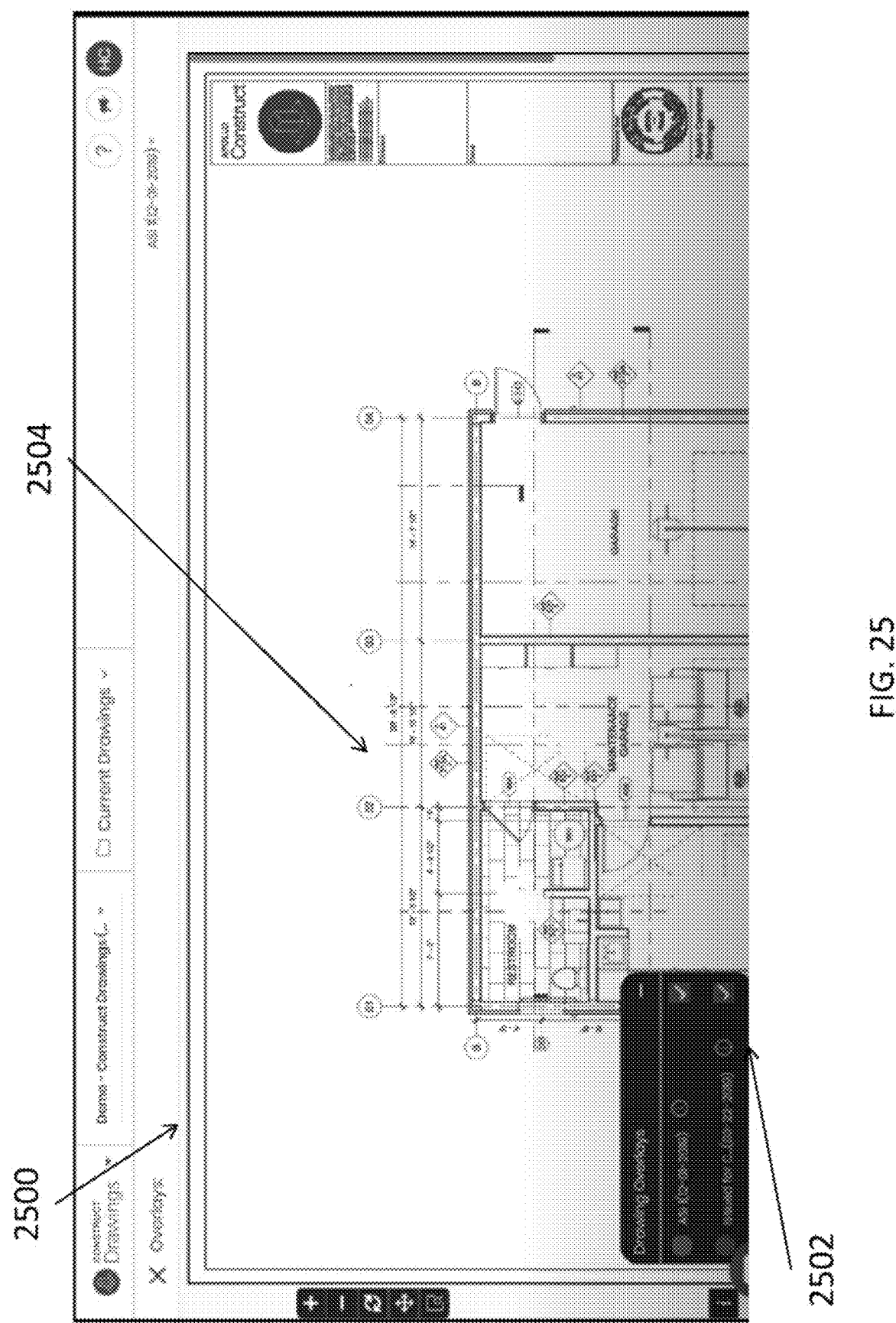
FIG. 25 is an illustration of a window showing two overlaid drawings in the drawings application shown in FIG. 2.

FIG. 25 is an illustration of a window 2500 showing two overlaid drawings. The window 2500 includes a list 2502 of the drawings and/or versions of the drawings that are displayed as being overlaid and a display 2504 of the overlaid drawings. The display 2504 may show and/or highlight the differences between the overlaid drawings. For example, the construct computing system 200 may overlay two different versions of a drawing (e.g., an original drawing and a modified drawing) such that the overlaid drawings may be displayed 2504 (e.g., by the drawings application 118). Since the construct computing system 200 stores all modifications made to the drawings 136, the construct computing system 200 may quickly determine the differences between the drawings 136 and display 2504 the overlaid drawings and any modifications made between the drawings 136.

Figure 26:
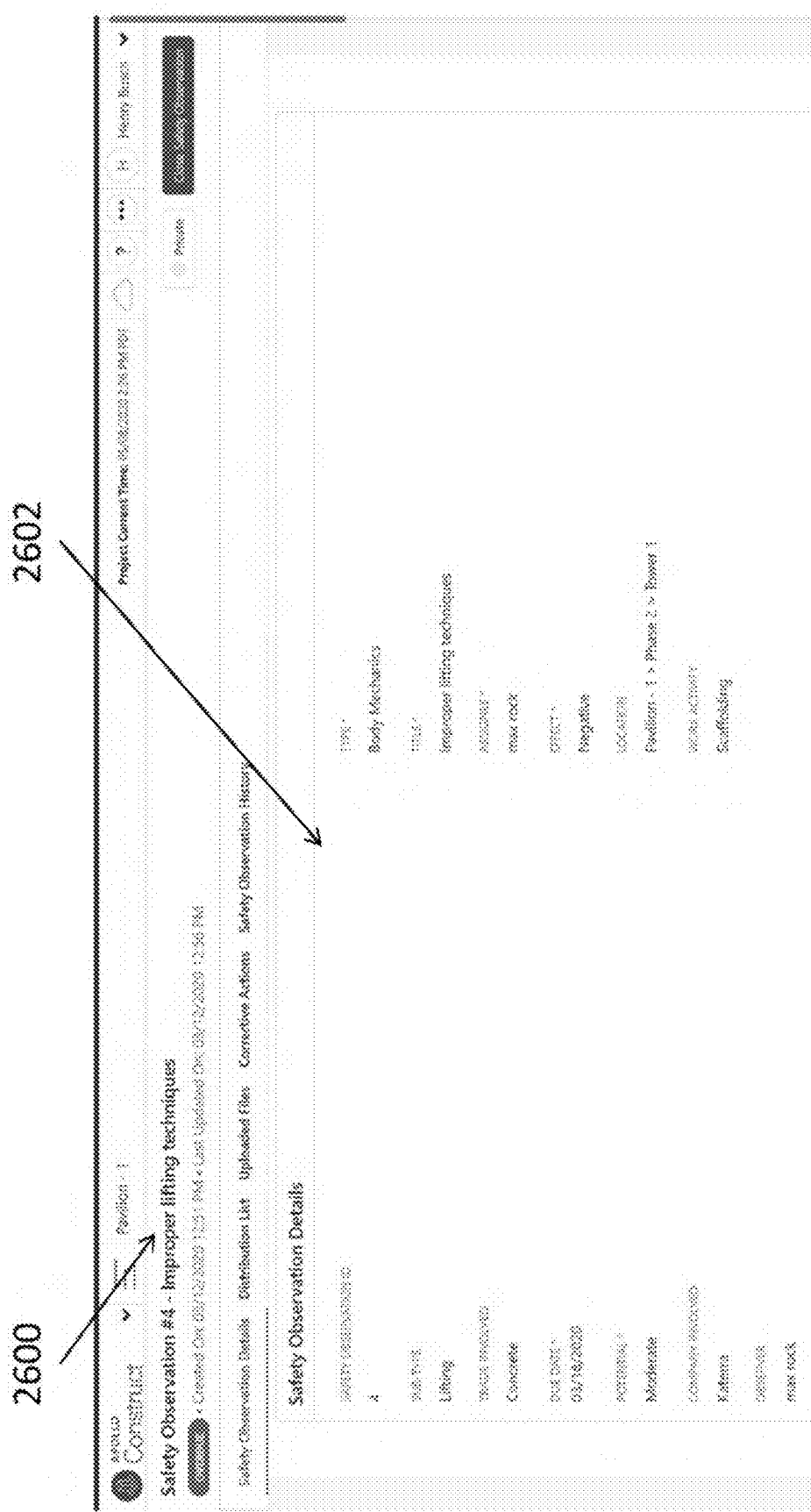
FIG. 26 is an illustration of a "Safety Observations" window of the construct computing device shown in FIG. 2.

FIG. 26 is an illustration of a "Safety Observations" window 2600. In some embodiments, the window 2600 may be displayed (e.g., by the drawings application 118) when the user selects that an observation 2008 (shown in FIG. 20) be linked to the drawing. In other embodiments, the window 2600 is displayed by the construct computing system 200 through any of the applications 118, 120, 122 (shown in FIG. 2) when, for example, the construct computing system 200 generates the safety observation. The window 2600 includes a list 2602 of safety observations associated with the construction project. The safety observations may be linked to one or more drawings and/or may be view through the construct computing system 200. The safety observations may have been made by users and/or the safety observations may have been generated by the construct computing system 200.

FIGS. 16-26 illustrate how users may interact with the drawings 136 through the drawings application 118 by, for example, annotating the drawings 136, hyperlinking certain data or requests to the drawings 136, viewing the drawings 136 in various ways (e.g., overlaying the drawings to determine differences between different versions of the modified drawings), etc. Further, the construct computing device 200 (e.g., through the drawings application 118) ensures that each user is (i) viewing the same drawing 136 including all modifications made by the user and other users and (ii) viewing the most updated version of the drawing 136. The construct computing device 200 also ensures that the drawings 136 and each modification 138 to the drawings 136 is safely stored such that each modification 138 can be accessed by the users, if necessary. In some embodiments, the construct computing system 200 uses a blockchain to store the drawings 136 and each new modified version of the drawings 136. The construct computing device 200 also allows users to categorize and sort the drawings according to the preferences of the user and tags associated with the drawings 136. Accordingly, the construct computing system 200 and the drawings application 118 allow users to efficiently and effectively interact with the drawings 136 associated with a construction project such that the construction project can be timely completed.

Exemplary Data Flow of Computing System

Figure 27:
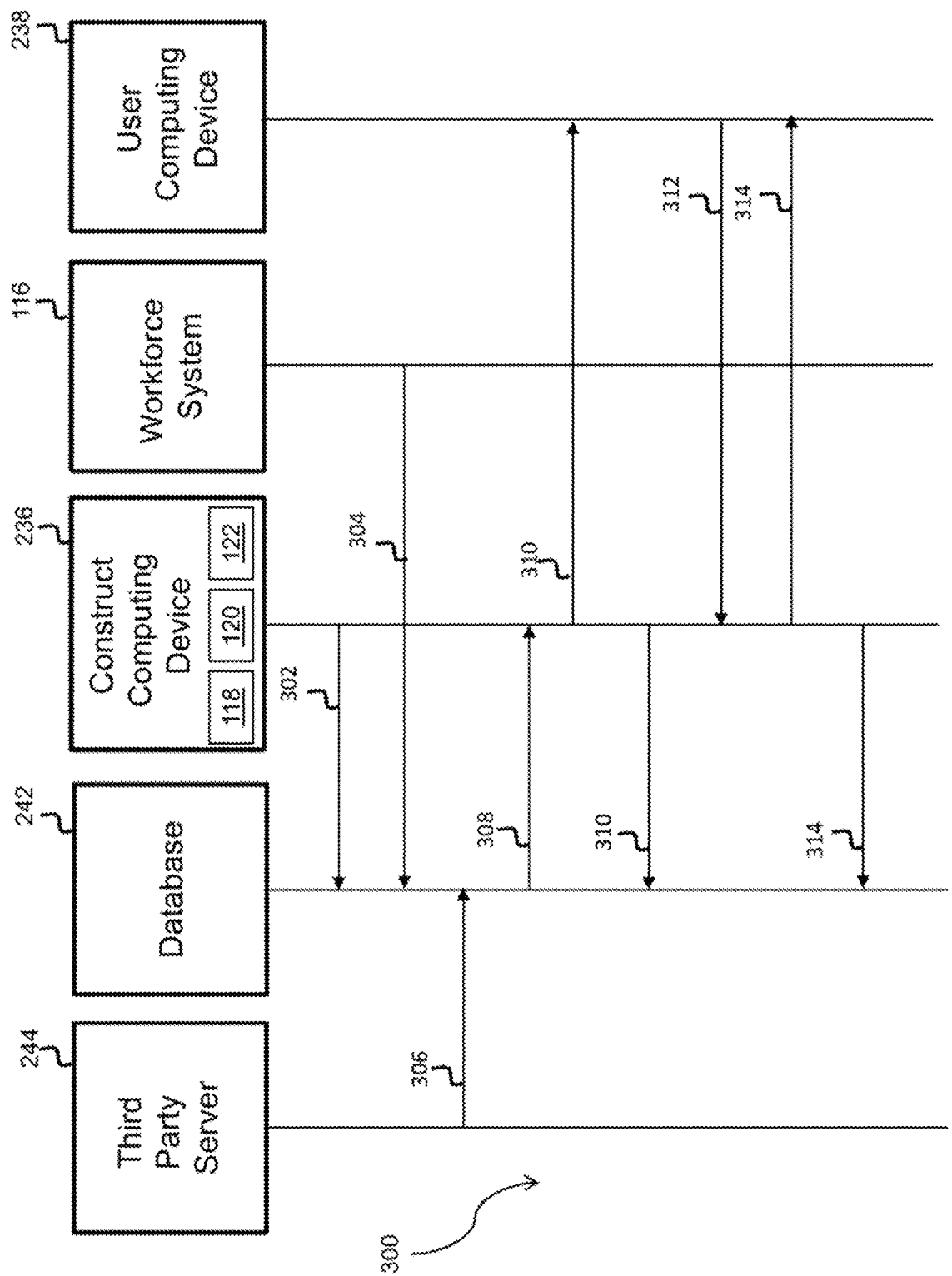
FIG. 27 is a dataflow diagram of the construct computing system shown in FIG. 3A.

FIG. 27 is a flowchart of data flow, generally indicated at 300, through the construct computing system 200 (shown in FIG. 3A). Specifically, the flowchart shows the data flow 300 between the third party server 244, the database 242, the construct computing device 236 including the drawings application 118, the scheduler application 120, and the budgeter application 122, the workforce system 116, and the user computing device 238.

Construction data 302 is transmitted from the construct computing device 236 to the database 242 to be stored. The construction data 302 may include scheduling data, budgeting data, and/or drawing data, as described herein. Further, the construction data 302 may be input into the construct computing device 236 by a user through any of the applications 118, 120, 122, and/or the construction data 302 may be generated by any of the construct computing device 236 and the applications 118, 120, 122. In the exemplary embodiment, construction data 304 may also be transmitted from the workforce system 116 to the database 242 to be stored. The construction data 304 may include a workforce schedule and any other data relating to the workforce used to complete the construction project. In other embodiments, the workforce system 116 may transmit the construction data 304 to the construct computing device 236, and the construct computing device 236 may then transmit the construction data 304 to the database 242 to be stored. In the exemplary embodiment, construction data 306 may be transmitted from a third party server 244 to the database 242 to be stored. The construction data 306 may include, for example, material price lists, additional workforce schedules, or any other data relating to the construction project from third parties. In other embodiments, the third party sever 244 may transmit the construction data 306 to the construct computing device 236, and the construct computing device 236 may then transmit the construction data 306 to the database 242 to be stored.

The database 242 transmits construction data 308 to the construct computing device 236. Construction data 308 may include all construction data 302, 304, and 306 in a standardized format and/or in a single file. Accordingly, construction data 308 is combined into a single stream of data from the database 242 to the construct computing device 236. Further, the construction data 308 can be used by any of the applications 118, 120, 122 and the construct computing device 236. In some embodiments, the construct computing device 236 sends the respective construction data 308 to the applications 118, 120, 122 for the applications to process the construction data 308 such that the construction data 308 is processed more quickly and efficiently than all of the construction data 308 being processed by the construct computing device 236 alone. The construct computing device 236 utilizes the construction data 308 to generate a schedule and a budget, as described above, especially with respect to FIGS. 3B and 3C.

The construct computing device 236 transmits the schedule, budget, and drawings 310 to the user computing device 238 for display to the user of the user computing device. The construct computing device 236 also stores the schedule, budget, and drawings 310 in the database 242. The user of the user computing device 238 may input modifications 312 to the construct computing device 236 to any of the schedule, budget, and drawings. The modifications 312 can be any of the modifications described herein including, for example, a schedule update request, a change order, a budget allocation modification, an annotation to the drawings, attaching a request for information to the drawings, etc.

In response to receiving the modification 312, the construct computing device 236, either itself or through the applications 118, 120, 122, carries out the modifications 312 to each of the schedule, the budget, and the drawings. For example, if the modification 312 is adding a beam to a drawing, the construct computing device 236 modifies 314 the drawing to include the beam and then the construct computing device 236 also modifies (i) the schedule to include a task of adding the beam and the time associated with the task and (ii) the budget to include the cost of the added beam (e.g., the material cost of the added beam, any additional costs associated with the workforce to add the beam, and any transportation/change costs associated with the added beam). The construct computing device 236 transmits the modifications 314 to the schedule, budget, and drawings to the user computing device 238 to be displayed on the user computing device to the user. The construct computing device 236 also transmits the modifications 314 to the database 242 to be stored.

Exemplary User Computing Device

Figure 28:
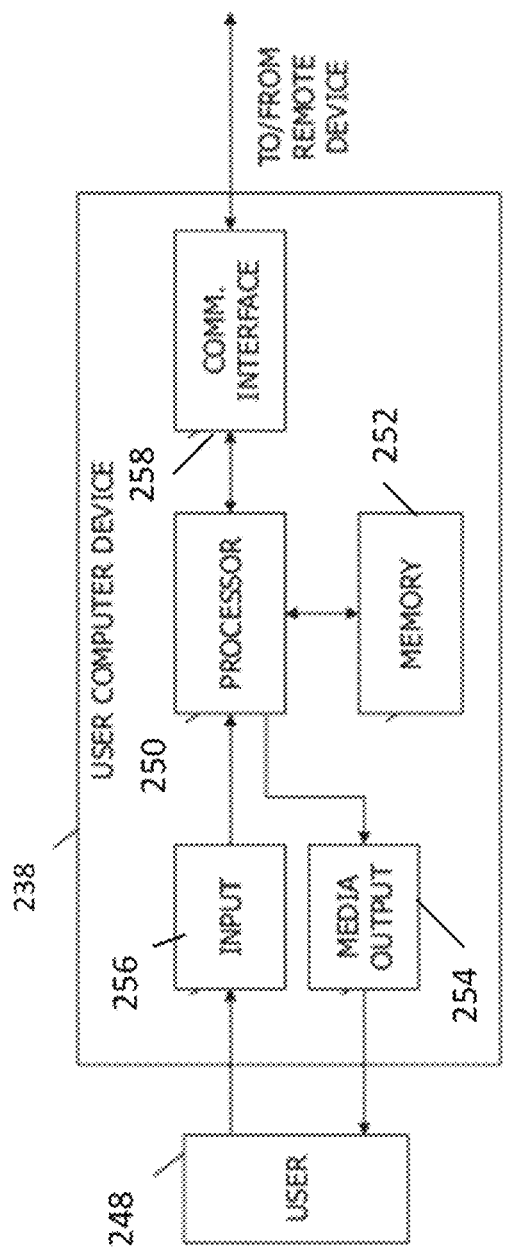
FIG. 28 is a simplified block diagram of an exemplary configuration of a user computer device shown in FIG. 3A.

FIG. 28 depicts an exemplary configuration of a user computer device 238 shown in FIG. 3A, in accordance with one embodiment of the present disclosure. The user computer device 238 may be operated by a user 248. The user computer device 238 may include a processor 250 for executing instructions. In some embodiments, executable instructions are stored in a memory area 252. The processor 250 may include one or more processing units (e.g., in a multi-core configuration). The memory area 252 may be any device allowing data such as executable instructions and/or transaction data to be stored and retrieved. The memory area 252 may include one or more computer readable media.

The user computer device 238 may also include at least one media output component 254 for presenting data to the user 248. The media output component 254 may be any component capable of conveying data to the user 248. In some embodiments, the media output component 254 may include an output adapter (not shown) such as a video adapter and/or an audio adapter. An output adapter may be operatively coupled to the processor 250 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, the media output component 254 may be configured to present a graphical user interface (e.g., a web browser and/or a client application) to the user 248. A graphical user interface may include, for example, a drawings display and/or an interactive Gantt schedule. In some embodiments, the user computer device 238 may include an input device 256 for receiving input from the user 248. The user 248 may use the input device 256 to, without limitation, select and/or enter drawings or other construction data, modify scheduling data, budgeting data, and/or drawings, view the schedule, budget, and/or drawings, etc.

The input device 256 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 254 and the input device 256.

The user computer device 238 may also include a communication interface 258, communicatively coupled to a remote device such as the construct computing device 236 (shown in FIG. 3A). The communication interface 258 may include, for example, a wired or wireless network adapter and/or a wireless data transceiver for use with a mobile telecommunications network.

Stored in the memory area 252 are, for example, computer readable instructions for providing a user interface to user 248 via media output component 254 and, optionally, receiving and processing input from input device 256. A user interface may include, among other possibilities, a web browser and/or a client application. Web browsers enable users, such as the user 248, to display and interact with media and other data typically embedded on a web page or a website from the construct computing device 236. A client application allows the user 248 to interact with, for example, the construct computing device 236. For example, instructions may be stored by a cloud service, and the output of the execution of the instructions sent to the media output component 254.

The processor 250 executes computer-executable instructions for implementing aspects of the disclosure. In some embodiments, the processor 250 is transformed into a special purpose microprocessor by executing computer-executable instructions or by otherwise being programmed.

Exemplary Server Computing Device

Figure 29:
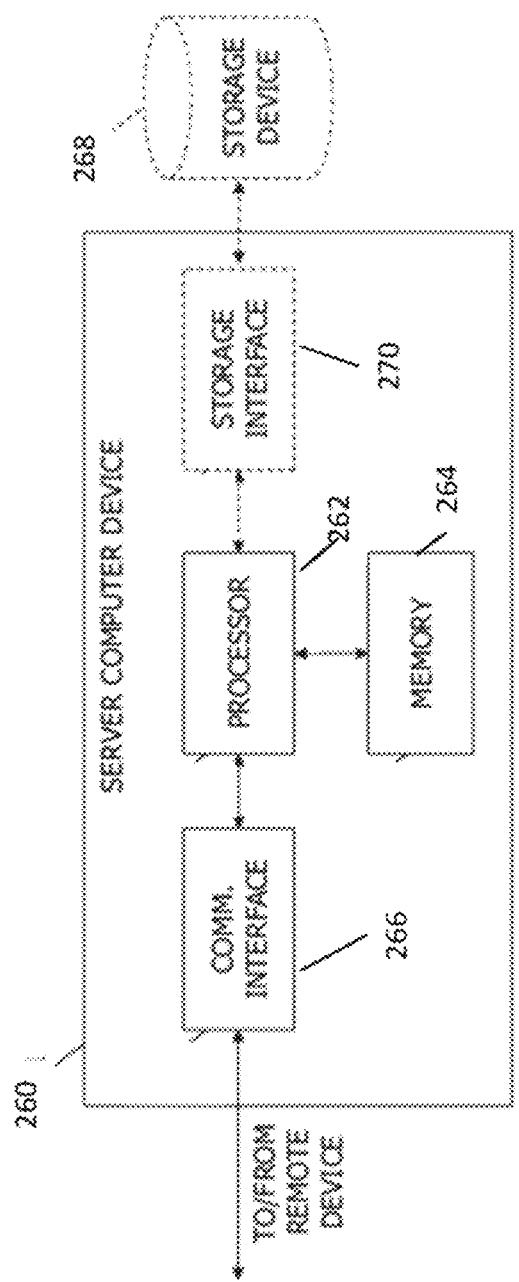
FIG. 29 is a simplified block diagram of an exemplary configuration of a server shown in FIG. 3A.

FIG. 29 depicts an exemplary configuration of a server computer device 260, in accordance with one embodiment of the present disclosure. The server computer device 260 may include, but is not limited to, the database server 240, the construct computing device 236, the workforce system 116, and the third party server 244 (all shown in FIG. 27). The server computer device 260 may also include a processor 262 for executing instructions. Instructions may be stored in a memory area 264. The processor 262 may include one or more processing units (e.g., in a multi-core configuration).

The processor 262 may be operatively coupled to a communication interface 266 such that server computer device 260 is capable of communicating with a remote device such as another server computer device 260, third party server 244, workforce system 116, or the user computer devices 238 (shown in FIG. 3A). For example, the communication interface 266 may receive requests from user computer devices 238 via the Internet, as illustrated in FIG. 3A.

The processor 262 may also be operatively coupled to a storage device 268. The storage device 268 may be any computer-operated hardware suitable for storing and/or retrieving data, such as, but not limited to, data associated with the database 242 (shown in FIG. 3A). In some embodiments, the storage device 268 may be integrated in the server computer device 260. For example, the server computer device 260 may include one or more hard disk drives as the storage device 268.

In other embodiments, the storage device 268 may be external to the server computer device 260 and may be accessed by a plurality of server computer devices 260. For example, the storage device 268 may include a storage area network (SAN), a network attached storage (NAS) system, and/or multiple storage units such as hard disks and/or solid state disks in a redundant array of inexpensive disks (RAID) configuration.

In some embodiments, the processor 262 may be operatively coupled to the storage device 268 via a storage interface 270. The storage interface 270 may be any component capable of providing the processor 262 with access to the storage device 268. The storage interface 270 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 262 with access to the storage device 268.

The processor 262 may execute computer-executable instructions for implementing aspects of the disclosure. In some embodiments, the processor 262 may be transformed into a special purpose microprocessor by executing computer-executable instructions or by otherwise being programmed. For example, the processor 262 may be programmed with the instruction such as illustrated in FIGS. 30 and 31.

Exemplary Methods

Figure 30:
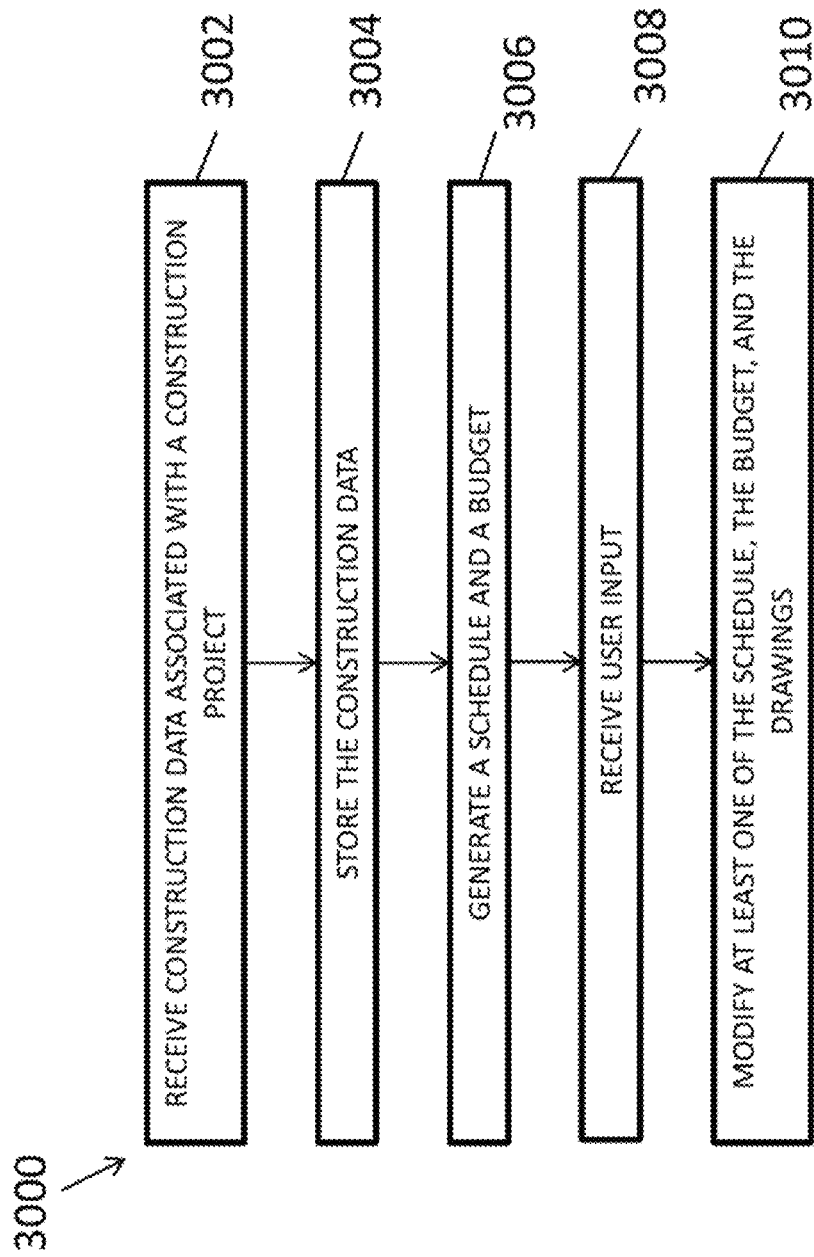
FIG. 30 is an exemplary computer-implemented method associated with the construct computing system shown in FIG. 3A.
Figure 31:
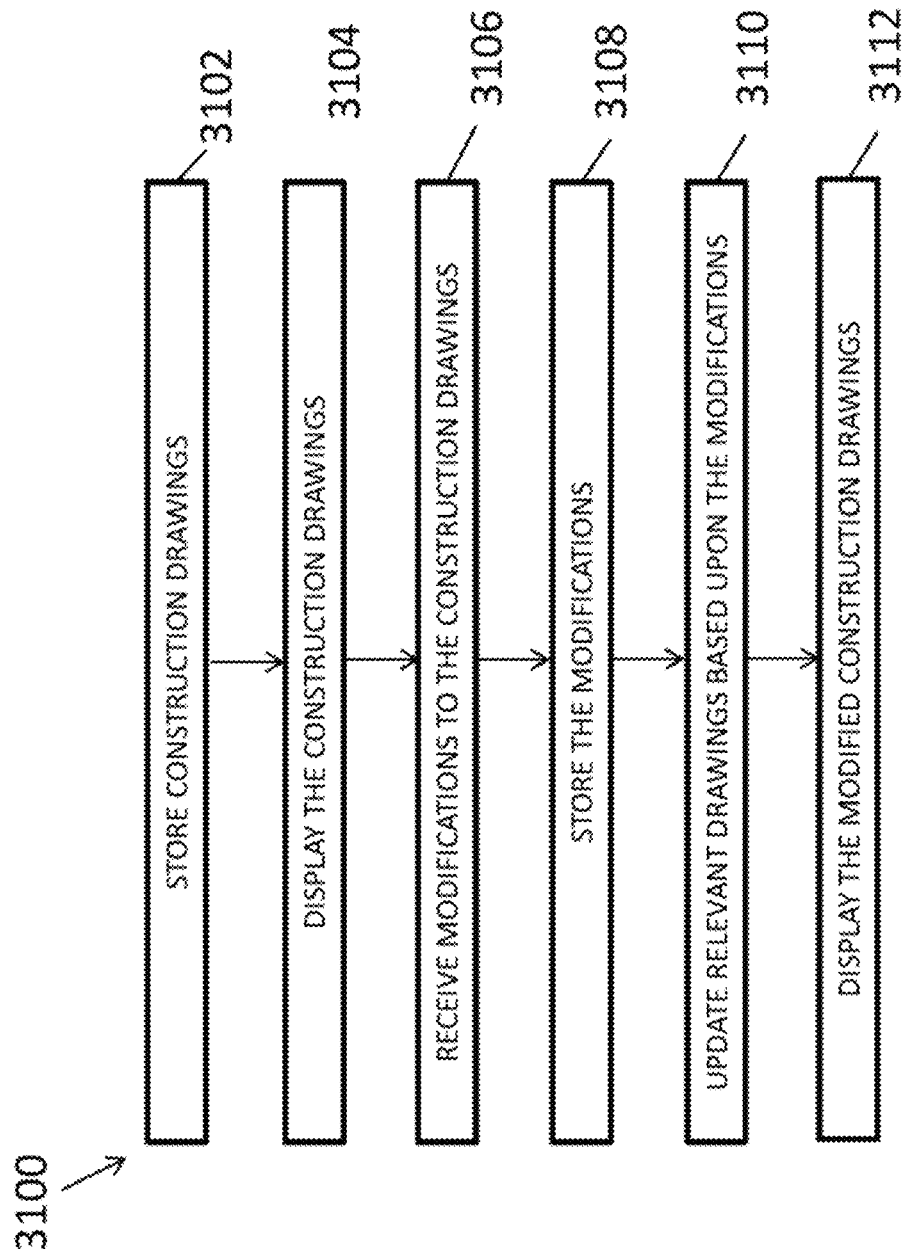
FIG. 31 is an exemplary computer-implemented method associated with the construct computing system shown in FIG. 3A.

FIG. 30 is a flow chart of a method 3000 of generating a budget and schedule for a construction project. The method 3000 may be implemented using the construct computing system 200. The construct computing system 200 includes at least one computing device (e.g., the server computer device 260, shown in FIG. 29) including a processor in communication with a memory. The processor may be programmed to operate in accordance with instructions stored in the memory that cause the computing device to perform the steps of the method 3000.

The server computer device is configured to receive 3002 construction data associated with a construction project. The construction data may include scheduling data, budgeting data, and drawing data. The server computer device stores 3004 the construct data in the memory (e.g., database 242 shown in FIG. 3A). Based upon the construction data, the server computer device generates 3006 a schedule and a budget for the construction project based upon the construction data.

The server computer device is configured to receive 3008, from a user computing device (e.g., user computing device 238 shown in FIG. 3A), input associated with the construction data, wherein the input includes a modification to at least one of the scheduling data, the budgeting data, and the drawings. The server computer device is further configured to modify 3010 at least one of the schedule, the budget, and the drawings based upon the input.

In some embodiments, the scheduling data may include a project specification, a construction activity schedule, a workforce schedule, and a plurality of tasks required to complete the construction project. The budgeting data may include a parts list, construction site conditions, a budget for the construction project, an allocation list indicating a percentage of the budget allocated for each aspect of the construction project, and costs associated with each aspect of the construction project. The drawing data may include construction drawings associated with the construction project and data associated with the construction drawings. Further, the server computer device may be communicatively coupled to the scheduling application 120, the budgeting application 122, and the drawings application 118 (shown in FIG. 3A). The scheduling application 120 may be configured to process the scheduling data. The budgeting application 122 may configured to process the budgeting data. The drawings application 118 may be configured to process the drawing data. Each of the applications 118, 120, 122 enable a user associated with the user computing device (e.g., user computing device 238) to input and receive respective data from the server computer device.

The server computer device may further be configured to: (i) display, through the scheduling application 120, the scheduling data and the schedule 124 to the user computing device 238, (ii) display, through the budgeting application 122, the budgeting data and the budget 130 to the user computing device 238, (iii) display, through the drawing application 118, the drawings data and the drawings 136 to the user computing device 238, and/or (iv) modify, in response to receiving the input (e.g., modifications 126, 132, 138 shown in FIG. 3B), each of the scheduling data, the budgeting data, and the drawings based upon the input.

In some embodiments, the input includes a change order, and the change order includes a change in scope of the construction project based on at least one of a change in the scheduling data, the budgeting data, and the drawings. Accordingly, the server computer device may further configured to: (i) build the change order based on the input, (ii) perform a look-up in the memory (e.g., database 242) to determine a supervising user of the user associated with the input, (iii) prompt the supervising user to approve the change request, (iv) determine modifications to at least one of the budget, the schedule, and the drawings based upon the change request, and/or (v) in response to approval of the change request from the supervising user, modify the budget, the schedule, and the drawings based upon the determined modification.

In some further embodiments, the input is a drawing modification (e.g., drawing modification 138 shown in FIG. 3B) of the drawings 136, and the drawing modification may include at least one of replacement drawings to replace one or more of the drawings and an annotation to the drawings. The annotation may be made directly on the drawings through a drawings application, and the server computer device may further be configured to: (i) store, in the memory, the drawings including the drawing modification, (ii) modify the schedule and the budget based upon the drawing modification, (iii) receive, from the user computing device, a request for information (RFI) associated with at least one of the drawings and the drawing data, (iv) link the RFI to at least one construction drawing, (v) analyze the construction data, (vi) generate one or more safety observations based upon at least one of the analyzed construction data and input, (vii) generate a billing schedule based upon the construction schedule, wherein the billing schedule determines a billing period for distributing payments to users associated with the construction project, and wherein the users include at least one of employees, contractors, and sub-contractors, and/or (viii) update the schedule and the scheduling data to include the billing schedule.

FIG. 31 is a flow chart of a method 3100 of modifying construction drawings associated with a construction project. The method 3100 may be implemented using the construct computing system 200. The construct computing system 200 includes at least one computing device (e.g., the server computer device 260, shown in FIG. 29) including a processor in communication with a memory. The processor may be programmed to operate in accordance with instructions stored in the memory that cause the computing device to perform the steps of the method 3100.

The server computer device may be configured to store 3102, in the memory (e.g., database 242), a plurality of construction drawings associated with a construction project and display 3104, through a drawings application in communication with the drawings computing device, the plurality of construction drawings on a user computing device. Further, the server computer device may receive 3106, from the user computing device, modifications to at least one construction drawing of the plurality of construction drawings, wherein the modifications are input directly into the drawings application. The server computer device may be configured to store 3108, in the one memory, the modifications to the at least one construction drawing. Additionally, the server computer device may be configured to update 3110 the relevant construction drawings based upon the modifications and display 3112 the modified construction drawings on the user computing device.

Machine Learning & Other Matters

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, and/or servers, and/or via computer executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, machine learning may be used to determine how a budget and a schedule should be modified in response to a drawing modification.

Additionally or alternatively, the machine learning programs may be trained by inputting sample (e.g., training) data sets or certain data into the programs, such as conversation data of spoken conversations to be analyzed, mobile device data, and/or additional speech data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed.

As will be appreciated based on the foregoing specification, the above-described embodiments of the disclosure may be implemented using computer programming or engineering techniques including computer software, firmware, hardware or any combination or subset thereof, wherein the technical effect is to provide virtualization and fraud security around fundraising and redemption in an online payment transaction environment. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A construct computing system including a construct computing device including at least one processor in communication with at least one memory device configured to store instructions, which, when executed by the at least one processor, cause the at least one processor to:
   receive construction data associated with a construction project, wherein the construction data includes scheduling data, budgeting data, and drawing data associated with drawings of the construction project;
   generate and store the construction data as a chain of a plurality of blockchain blocks, at least one blockchain block of the plurality of blockchain blocks including a respective timestamp and a link to a hashed copy of one or more previous blockchain blocks of the chain of the plurality of blockchain blocks, each blockchain block of the plurality of blockchain blocks encrypted using cryptography;
   generate a schedule and a budget for the construction project based upon the stored construction data;
   display the schedule, the budget, and the drawings on a first user computing device;
   receive, from the first user computing device, input associated with at least one of the schedule, the budget, and the drawings, wherein the input includes a modification to at least one of the schedule, the budget, and the drawings, and wherein the modification is made directly to the at least one of the schedule, the budget, and the drawings;
   display, through a drawings application, an overlay of at least one drawing of the drawings over at least one other drawing of the drawings;
   compare the at least one drawing to the at least one other drawing to determine comparison features between the compared drawings;
   display, through the drawings application, the comparison features;
   perform a look up to determine a supervising user of a user associated with the input; and
   in response to determining that the modification includes a change in scope of the construction project that requires approval by the supervising user;
      build a change order including the modification and effects of the modification on any of the schedule, the budget, and the drawings;
      transmit the change order to a second user computing device associated with the supervising user;
      receive, from the second user computing device, user input from the supervising user, the user input indicating that the supervising user approves the change order; and
      generate and store, in response to receiving the user input, a modification to at least one of the schedule, the budget, and the drawings based upon the input as a new blockchain block added to the chain of the plurality of blockchain blocks.

2. The construct computing system of claim 1, wherein the scheduling data includes a project specification, a construction activity schedule, a workforce schedule, and a plurality of tasks required to complete the construction project, wherein the budgeting data includes a parts list, construction site conditions, a budget for the construction project, an allocation list indicating a percentage of the budget allocated for each aspect of the construction project, and costs associated with each aspect of the construction project, and wherein the drawing data includes construction drawings associated with the construction project and data associated with the construction drawings.

3. The construct computing system of claim 1, wherein the construct computing device is communicatively coupled to a scheduling application, a budgeting application, and a drawings application, wherein the scheduling application is configured to process the scheduling data, wherein the budgeting application is configured to process the budgeting data, wherein the drawings application is configured to process the drawing data, and wherein each of the applications enable the user associated with the first user computing device to input and receive respective data from the construct computing device.

4. The construct computing system of claim 3, wherein the at least one processor is further configured to:
display, through the scheduling application, the scheduling data and the schedule to the first user computing device;
display, through the budgeting application, the budgeting data and the budget to the first user computing device; and
display, through the drawing application, the drawings data and the drawings to the first user computing device.

5. The construct computing system of claim 3, wherein the at least one processor is further configured to:
modify, in response to receiving the input, each of the scheduling data, the budgeting data, and the drawings based upon the input.

6. The construct computing system of claim 1, wherein the input is a drawing modification of the drawings, wherein the drawing modification includes at least one of replacement drawings to replace one or more of the drawings and an annotation to the drawings, wherein the annotation is made directly on the drawings through a drawings application, and wherein the at least one processor is further programmed to:
modify the schedule and the budget based upon the drawing modification.

7. The construct computing system of claim 1, wherein the at least one processor is further configured to:
receive, from the first user computing device, a request for information (RFI) associated with at least one of the drawings and the drawing data; and
link the RFI to at least one construction drawing.

8. The construct computing system of claim 1, wherein the at least one processor is further configured to:
analyze the construction data; and
generate one or more safety observations based upon at least one of the analyzed construction data and input.

9. The construct computing system of claim 1, wherein the at least one processor is further programmed to:
generate a billing schedule based upon the construction schedule, wherein the billing schedule determines a billing period for distributing payments to users associated with the construction project, and wherein the users include at least one of employees, contractors, and sub-contractors; and
update the schedule and the scheduling data to include the billing schedule.

10. The construct computing system of claim 1, wherein the at least one processor is programmed to:
store a plurality of construction drawings associated with the construction project in the chain of the plurality of blockchain blocks;
display, through the drawings application in communication with the construct computing device, the plurality of construction drawings on the first user computing device;
receive, from the first user computing device, modifications to at least one construction drawing of the plurality of construction drawings, wherein the modifications are input directly into the drawings application;
store the modifications to the at least one construction drawing in the chain of the plurality of blockchain blocks;
update the relevant construction drawings based upon the modifications; and
display the modified construction drawings on the first user computing device.

11. The construction computing system of claim 10, wherein the modifications include at least one of replacement drawings to replace one or more of the plurality of construction drawings, an annotation marked on the construction drawing, linking a request for information (RFI) to the construction drawing, linking one or more other constructions drawings to the construction drawing, and linking one or more photos stored on the first user computing device to the construction drawing.

12. The construction computing system of claim 10, wherein the at least one processor is further programmed to:
link the modifications made to each of the construction drawings; and
store the modifications in the chain of the plurality of blockchain blocks.

13. The construction computing system of claim 10, wherein the construction drawings include classifications, and wherein the at least one processor is further programmed to sort the construction drawings by classification.

14. The construction computing system of claim 10, wherein the at least one processor is further programmed to:
analyze the construction drawings;
generate one or more safety observations based upon at least one of the analyzed construction data and input; and
link the safety observations to the construction drawings.

15. The construction computing system of claim 10, wherein the at least one processor is further programmed to:
receive a tag for a construction drawing from the first user computing device, the tag including at least one of a category of the construction drawing and a folder of the construction drawing; and
sort the plurality of construction drawings by the tags associated with the drawings.

16. The construct computing system of claim 1, wherein the new blockchain block added to the chain of the plurality of blockchain blocks includes the modification to at least one of the schedule, the budget, and the drawings, and a hashed copy of the previous version of the at least one of the schedule, the budget, and the drawings.

17. A computer-implemented method implemented by a construct computing system including a construct computing device including at least one processor in communication with at least one memory device configured to store instructions of the computer-implemented method, the computer-implemented method comprising:

receiving construction data associated with a construction project, wherein the construction data includes scheduling data, budgeting data, and drawing data associated with drawings of the construction project;

generating and storing the construction data as a chain of a plurality of blockchain blocks, at least one blockchain block of the plurality of blockchain blocks including a respective timestamp and a link to a hashed copy of one or more previous blockchain blocks of the chain of the plurality of blockchain blocks, each blockchain block of the plurality of blockchain blocks encrypted using cryptography;

generating a schedule and a budget for the construction project based upon the construction data;

displaying the schedule, the budget, and the drawings on a first user computing device, wherein the drawings are displayed through a drawings application in communication with the construct computing device;

receiving, from the first user computing device, input associated with at least one of the schedule, the budget, and the drawings, wherein the input includes a modification to at least one drawing of the drawings, and wherein the modification to the at least one drawing is input directly into the drawings application;

display, through the drawings application, an overlay of at least one drawing of the drawings over at least one other drawing of the drawings;

compare the at least one drawing to the at least one other drawing to determine comparison features between the compared drawings;

display, through the drawings application, the comparison features;

performing a look-up to determine a supervising user of a user associated with the input; and in response to determining that the modification includes a change in scope of the construction project that requires approval by the supervising user:
building a change order including the modification and effects of the modification on any of the schedule, the budget, and the drawings;
transmitting the change order to a second user computing device associated with the supervising user;
receiving, from the second user computing device, user input from the supervising user, the user input indicating that the supervising user approves the change order; and
generating and storing, in response to receiving the user input, a modification to at least one of the schedule, the budget, and the drawings based upon the input as a new blockchain block added to the chain of the plurality of blockchain blocks.

18. The computer-implemented method of claim 17, wherein the scheduling data includes a project specification, a construction activity schedule, a workforce schedule, and a plurality of tasks required to complete the construction project, wherein the budgeting data includes a parts list, construction site conditions, a budget for the construction project, an allocation list indicating a percentage of the budget allocated for each aspect of the construction project, and costs associated with each aspect of the construction project, and wherein the drawing data includes construction drawings associated with the construction project and data associated with the construction drawings.

19. The computer-implemented method of claim 17, wherein the construct computing device is communicatively coupled to a scheduling application, a budgeting application, and a drawings application, wherein the scheduling application is configured to process the scheduling data, wherein the budgeting application is configured to process the budgeting data, wherein the drawings application is configured to process the drawing data, and wherein each of the applications enable the user associated with the first user computing device to input and receive respective data from the construct computing device.

20. The computer-implemented method of claim 19 further comprising:
displaying, through the scheduling application, the scheduling data and the schedule to the first user computing device;
displaying, through the budgeting application, the budgeting data and the budget to the first user computing device; and
displaying, through the drawing application, the drawings data and the drawings to the first user computing device.

21. The computer-implemented method of claim 19 further comprising:
modifying, in response to receiving the input, each of the scheduling data, the budgeting data, and the drawings based upon the input.

22. The computer-implemented method of claim 17, wherein the input is a drawing modification of the drawings, wherein the drawing modification includes at least one of replacement drawings to replace one or more of the drawings and an annotation to the drawings, wherein the annotation is made directly on the drawings through a drawings application, and wherein the computer-implemented method further comprises:
modifying the schedule and the budget based upon the drawing modification.

23. The computer-implemented method of claim 17 further comprising:
receiving, from the first user computing device, a request for information (RFI) associated with at least one of the drawings and the drawing data; and
linking the RFI to at least one construction drawing.

24. The computer-implemented method of claim 17 further comprising:
analyzing the construction data; and
generating one or more safety observations based upon at least one of the analyzed construction data and input.

25. The computer-implemented method of claim 17 further comprising:
generating a billing schedule based upon the schedule, wherein the billing schedule determines a billing period for distributing payments to users associated with the construction project, and wherein the users include at least one of employees, contractors, and sub-contractors; and
updating the schedule and the scheduling data to include the billing schedule.

26. The computer-implemented method of claim 17 further comprising:
storing a plurality of construction drawings associated with the construction project in the chain of the plurality of blockchain blocks;
displaying, through the drawings application in communication with the construct computing device, the plurality of construction drawings on the first user computing device;

receiving, from the first user computing device, modifications to at least one construction drawing of the plurality of construction drawings, wherein the modifications are input directly into the drawings application;

storing the modifications to the at least one construction drawing in the chain of the plurality of blockchain blocks;

updating the relevant construction drawings based upon the modifications; and displaying the modified construction drawings on the first user computing device.

27. The computer-implemented method of claim 26, wherein the modifications include at least one of replacement drawings to replace one or more of the plurality of construction drawings, an annotation marked on the construction drawing, linking a request for information (RFI) to the construction drawing, linking one or more other constructions drawings to the construction drawing, and linking one or more photos stored on the first user computing device to the construction drawing.

28. The computer-implemented method of claim 26 further comprising:
   linking the modifications made to each of the construction drawings; and
   storing the modifications in the chain of the plurality of blockchain blocks.

29. The computer-implemented method of claim 26, wherein the construction drawings include classifications, and wherein the computer-implemented method further comprises sorting the construction drawings by classification.

30. The computer-implemented method of claim 26 further comprising:
   analyzing the construction drawings;
   generating one or more safety observations based upon at least one of the analyzed construction data and input; and
   linking the safety observations to the construction drawings.

31. The computer-implemented method of claim 26 further comprising:
   receiving a tag for a construction drawing from the first user computing device, the tag including at least one of a category of the construction drawing and a folder of the construction drawing; and
   sorting the plurality of construction drawings by the tags associated with the drawings.

32. At least one non-transitory computer-readable media having computer-executable instructions embodied thereon, wherein when executed by a construct computing system including a construct computing device including at least one processor in communication with at least one memory device configured to store instructions, which, when executed by the at least one processor, cause the at least one processor to:
   receive construction data associated with a construction project, wherein the construction data includes scheduling data, budgeting data, and drawing data associated with drawings of the construction project;
   generate and store the construction data as a chain of a plurality of blockchain blocks, at least one blockchain block of the plurality of blockchain blocks including a respective timestamp and a link to a hashed copy of one or more previous blockchain blocks of the chain of the plurality of blockchain blocks, each blockchain block of the plurality of blockchain blocks encrypted using cryptography;
   generate a schedule and a budget for the construction project based upon the construction data;
   display the schedule, the budget, and the drawings on a first user computing device, wherein the drawings are displayed through a drawings application in communication with the construct computing device;
   receive, from the first user computing device, input associated with at least one of the schedule, the budget, and the drawings, wherein the input includes a modification to at least one drawing of the drawings, and wherein the modification to the at least one drawing is input directly into the drawings application;
   display, through the drawings application, an overlay of at least one drawing of the drawings over at least one other drawing of the drawings;
   compare the at least one drawing to the at least one other drawing to determine comparison features between the compared drawings;
   display, through the drawings application, the comparison features;
   perform a look-up to determine a supervising user of a user associated with the input;
   in response to determining that the modification includes a change in scope of the construction project that requires approval by the supervising user:
      build a change order including the modification and effects of the modification on any of the schedule, the budget, and the drawings;
      transmit the change order to a second user computing device associated with the supervising user;
      receive, from the second user computing device, user input from the supervising user, the user input indicating that the supervising user approves the change order; and
      generate and store, in response to receiving the user input, a modification to at least one of the schedule, the budget, and the drawings based upon the input as a new blockchain block added to the chain of the plurality of blockchain blocks.

33. The at least one non-transitory computer-readable media of claim 32, wherein the scheduling data includes a project specification, a construction activity schedule, a workforce schedule, and a plurality of tasks required to complete the construction project, wherein the budgeting data includes a parts list, construction site conditions, a budget for the construction project, an allocation list indicating a percentage of the budget allocated for each aspect of the construction project, and costs associated with each aspect of the construction project, and wherein the drawing data includes construction drawings associated with the construction project and data associated with the construction drawings.

34. The at least one non-transitory computer-readable media of claim 32, wherein the construct computing device is communicatively coupled to a scheduling application, a budgeting application, and a drawings application, wherein the scheduling application is configured to process the scheduling data, wherein the budgeting application is configured to process the budgeting data, wherein the drawings application is configured to process the drawing data, and wherein each of the applications enable the user associated with the first user computing device to input and receive respective data from the construct computing device.

35. The at least one non-transitory computer-readable media of claim 34, wherein the instructions further cause the at least one processor to:
- display, through the scheduling application, the scheduling data and the schedule to the first user computing device;
- display, through the budgeting application, the budgeting data and the budget to the first user computing device; and
- display, through the drawing application, the drawings data and the drawings to the first user computing device.

36. The at least one non-transitory computer-readable media of claim 34, wherein the instructions further cause the at least one processor to:
- modify, in response to receiving the input, each of the scheduling data, the budgeting data, and the drawings based upon the input.

37. The at least one non-transitory computer-readable media of claim 32, wherein the input is a drawing modification of the drawings, wherein the drawing modification includes at least one of replacement drawings to replace one or more of the drawings and an annotation to the drawings, wherein the annotation is made directly on the drawings through a drawings application, and wherein the instructions further cause the at least one processor to:
- modify the schedule and the budget based upon the drawing modification.

38. The at least one non-transitory computer-readable media of claim 32, wherein the instructions further cause the at least one processor to:
- receive, from the first user computing device, a request for information (RFI) associated with at least one of the drawings and the drawing data; and
- link the RFI to at least one construction drawing.

39. The at least one non-transitory computer-readable media of claim 32, wherein the instructions further cause the at least one processor to:
- analyze the construction data; and
- generate one or more safety observations based upon at least one of the analyzed construction data and input.

40. The at least one non-transitory computer-readable media of claim 32, wherein the instructions further cause the at least one processor to:
- generate a billing schedule based upon the schedule, wherein the billing schedule determines a billing period for distributing payments to users associated with the construction project, and wherein the users include at least one of employees, contractors, and sub-contractors; and
- update the schedule and the scheduling data to include the billing schedule.

41. The at least one non-transitory computer-readable media of claim 32, wherein the computer-executable instructions cause the at least one processor to:
- store a plurality of construction drawings associated with the construction project in the chain of the plurality of blockchain blocks;
- display, through drawings application in communication with the construct computing device, the plurality of construction drawings on the first user computing device;
- receive, from the first user computing device, modifications to at least one construction drawing of the plurality of construction drawings, wherein the modifications are input directly into the drawings application;
- store the modifications to the at least one construction drawing in the chain of the plurality of blockchain blocks;
- update the relevant construction drawings based upon the modifications; and
- display the modified construction drawings on the first user computing device.

42. The at least one non-transitory computer-readable media of claim 41, wherein the modifications include at least one of replacement drawings to replace one or more of the plurality of construction drawings, an annotation marked on the construction drawing, linking a request for information (RFI) to the construction drawing, linking one or more other constructions drawings to the construction drawing, and linking one or more photos stored on the first user computing device to the construction drawing.

43. The at least one non-transitory computer-readable media of claim 41, wherein the instructions further cause the at least one processor to:
- link the modifications made to each of the construction drawings; and
- store the modifications in the chain of the plurality of blockchain blocks.

44. The at least one non-transitory computer-readable media of claim 41, wherein the construction drawings include classifications, and wherein the instructions further cause the at least one processor to sort the construction drawings by classification.

45. The at least one non-transitory computer-readable media of claim 41, wherein the instructions further cause the at least one processor to:
- analyze the construction drawings;
- generate one or more safety observations based upon at least one of the analyzed construction data and input; and
- link the safety observations to the construction drawings.

46. The at least one non-transitory computer-readable media of claim 41, wherein the instructions further cause the at least one processor to:
- receive a tag for a construction drawing from the first user computing device, the tag including at least one of a category of the construction drawing and a folder of the construction drawing; and
- sort the plurality of construction drawings by the tags associated with the drawings.

47. A construction computing system including at least one processor in communication with at least one memory device, the at least one processor programmed to:
- receive construction data associated with a construction project, wherein the construction data includes scheduling data, budgeting data, and drawing data associated with drawings of the construction project;
- generate and store the construction data as a chain of a plurality of blockchain blocks, at least one blockchain block of the plurality of blockchain blocks including a respective timestamp and a link to a hashed copy of one or more previous blockchain blocks of the chain of the plurality of blockchain blocks, each blockchain block of the plurality of blockchain blocks encrypted using cryptography;
- generate a schedule and a budget for the construction project based upon the construction data;
- display the schedule, the budget, and the drawings on a first user computing device, wherein the drawings are displayed through a drawings application in communication with the construct computing device;

receive, from the first user computing device, input associated with at least one of the schedule, the budget, and the drawings, wherein the input includes a modification to at least one drawing of the drawings, and wherein the modification to the at least one drawing is input directly into the drawings application;

display, through the drawings application, an overlay of at least one drawing of the drawings over at least one other drawing of the drawings;

compare the at least one drawing to the at least one other drawing to determine comparison features between the compared drawings;

display, through the drawings application, the comparison features;

perform a look-up in the at least one memory device to determine a supervising user of a user associated with the input; and in response to determining that the modification includes a change in scope of the construction project that requires approval by the supervising user:
build a change order including the modification and effects of the modification on any of the schedule, the budget, and the drawings;
transmit the change order to a second user computing device associated with the supervising user;
receive, from the second user computing device, user input from the supervising user, the user input indicating that the supervising user approves the change order; and
generate and store, in response to receiving the user input, a modification to at least one of the schedule, the budget, and the drawings based upon the input as a new blockchain block added to the chain of the plurality of blockchain blocks.

* * * * *